United States Patent
Yang et al.

(10) Patent No.: US 12,480,113 B2
(45) Date of Patent: Nov. 25, 2025

(54) GLUTAMATE-CYSTEINE LIGASE VARIANT AND METHOD OF PRODUCING GLUTATHIONE USING THE SAME

(71) Applicant: CJ CHEILJEDANG CORPORATION, Seoul (KR)

(72) Inventors: Eun Bin Yang, Seoul (KR); Cheol Woong Ha, Seoul (KR); Yeonsoo Kim, Seoul (KR); Yeong Eun Im, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 379 days.

(21) Appl. No.: 17/914,306

(22) PCT Filed: Mar. 24, 2021

(86) PCT No.: PCT/KR2021/003617
§ 371 (c)(1),
(2) Date: Sep. 23, 2022

(87) PCT Pub. No.: WO2021/194243
PCT Pub. Date: Sep. 30, 2021

(65) Prior Publication Data
US 2024/0229006 A1 Jul. 11, 2024

(30) Foreign Application Priority Data
Mar. 25, 2020 (KR) .................... 10-2020-0036456

(51) Int. Cl.
*C12N 15/81* (2006.01)
*C12N 9/00* (2006.01)
*C12P 21/02* (2006.01)

(52) U.S. Cl.
CPC .............. *C12N 9/93* (2013.01); *C12N 15/81* (2013.01); *C12P 21/02* (2013.01); *C12Y 603/02002* (2013.01)

(58) Field of Classification Search
CPC ............. C12N 9/93; C12N 1/20; C12N 15/52
See application file for complete search history.

(56) References Cited

U.S. PATENT DOCUMENTS

2024/0229006 A1* 7/2024 Yang .................. C12N 9/93

FOREIGN PATENT DOCUMENTS

| EP | 1512747 A1 | 3/2005 |
| EP | 3101130 A1 | 12/2016 |
| JP | 2005073638 A | 3/2005 |
| KR | 10-2010-0095829 A | 9/2010 |
| KR | 10-2011-0118492 A | 10/2011 |
| WO | 2013/054447 A1 | 4/2013 |
| WO | 2022/145623 A1 | 7/2022 |

OTHER PUBLICATIONS

Cutler et al., "Replacement of cysteine-107 of *Saccharomyces cerevisiae* iso-1-cytochrome c with threonine: improved stability of the mutant protein", 1987, Protein Engineering, Design and Selection, vol. 1, Issue 2, p. 95-99.
Li et al., "Glutathione: a review on biotechnological production", 2004, Appl. Microbiol. Biotechnol., vol. 66, p. 233-242.
Office Action issued Sep. 26, 2023 for counterpart Brazilian Application No. BR112022019055-7.
International Search Report issued in corresponding International Patent Application No. PCT/KR2021/003617 dated Jun. 30, 2021.
Xu et al., "Effects of GHS1 and GSH2 gene mutation on glutathione synthetases activity of *Saccharomyces cerevisiae*," Protein Journal, 36: 270-277 (2017).
Intelligent biodesigneering A Powerful Tool for Revolution in Biotechnology, 1-13 (2017).
Sipes et al., "The role of glutathione in the toxicity of xenobiotic compounds: metabolic activation of 1,2-dibromoethane by glutathione," Advances in Experimental Medicine and Biology, 197: 457-467 (1986).
Ohtake et al., "Molecular Cloning of the gamma-Glutamylcysteine Synthetase Gene of *Saccharomyces cerevisiae*", 1991, Yeast, vol. 7, p. 953-961, XP002970457.
Biterova, et al., "Mechanistic Details of Glutathione Biosynthesis Revealed by Crystal Structures of *Saccharomyces cerevisiae* Glutamate Cysteine Ligase", 2009, Journal of Biological Chemistry, vol. 284, p. 32700-32708, XP002776013.
Biterova, et al., "Structural Basis for Feedback and Pharmacological Inhibition of *Saccharomyces cerevisiae* Glutamate Cysteine Ligase", 2010, Journal of Biological Chemistry, vol. 285, p. 14459-14466, XP93073445.
Office Action issued Aug. 25, 2023 for corresponding European Patent Application No. 21774874.8.
Office Action issued in corresponding International Patent Application No. 202180022763.4 dated Jan. 13, 2025.

* cited by examiner

Primary Examiner — Tekchand Saidha
(74) Attorney, Agent, or Firm — Morgan, Lewis & Bockius LLP

(57) ABSTRACT

Provided are a novel glutamate-cysteine ligase variant and a method of producing glutathione using the same.

20 Claims, No Drawings
Specification includes a Sequence Listing.

SEQUENCE LISTING

```
<160> NUMBER OF SEQ ID NOS: 29

<210> SEQ ID NO 1
<211> LENGTH: 678
<212> TYPE: PRT
<213> ORGANISM: Saccharomyces cerevisiae

<400> SEQUENCE: 1

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Cys Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
    210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
        275                 280                 285

Phe Ala Pro Ile Met Leu Ala Phe Ser Ala Ala Pro Ala Phe Lys
    290                 295                 300
```

```
Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Ile Ala Lys Asp Val Gln Asp
            340                 345                 350

Lys Val Leu Glu Ile Pro Lys Ser Arg Tyr Ser Val Asp Leu Phe
        355                 360                 365

Leu Gly Gly Ser Lys Phe Phe Asn Arg Thr Tyr Asn Asp Thr Asn Val
370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                405                 410                 415

Asp Pro Val Ser Thr Phe Glu Glu Leu Leu Asn Gln Asp Asn Lys Thr
                420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
            675

<210> SEQ ID NO 2
<211> LENGTH: 2037
<212> TYPE: DNA
<213> ORGANISM: Saccharomyces cerevisiae

<400> SEQUENCE: 2
```

```
atgggactct tagctttggg cacgcctttg cagtggtttg agtctaggac gtacaatgaa    60
cacataaggg atgaaggtat cgagcagttg ttgtatattt tccaagctgc tggtaaaaga   120
gacaatgacc ctcttttttg gggagacgag cttgagtaca tggttgtaga ttttgatgat   180
aaggagagaa attctatgct cgacgtttgc catgacaaga tactcactga gcttaatatg   240
gaggattcgt ccctttgtga ggctaacgat gtgagttttc accctgagta tggccggtat   300
atgttagagg caacaccagc ttctccatat ttgaattacg tgggtagtta cgttgaggtt   360
aacatgcaaa aaagacgtgc cattgcagaa tataagctat ctgaatatgc gagacaagat   420
agtaaaaata acttgcatgt gggctccagg tctgtcccct tgacgctgac tgtcttcccg   480
aggatgggat gccccgactt tattaacatt aaggatccgt ggaatcataa aaatgccgct   540
tccaggtctc tgttttacc cgatgaagtc attaacagac atgtcaggtt tcctaacttg   600
acagcatcca tcaggaccag gcgtggtgaa aaagtttgca tgaatgttcc catgtataaa   660
gatatagcta ctccagaaac ggatgactcc atctacgatc gagattggtt tttaccagaa   720
gacaaagagg cgaaactggc ttccaaaccg ggtttcattt atatggattc catgggtttt   780
ggcatgggct gttcgtgctt acaagtgacc tttcaggcac ccaatatcaa caaggcacgt   840
tacctgtacg atgcattagt gaattttgca cctataatgc tagccttctc tgccgctgcg   900
cctgctttta aaggttggct agccgaccaa gatgttcgtt ggaatgtgat atctggtgcg   960
gtggacgacc gtactccgaa ggaaagaggt gttgcgccat tactacccaa atacaacaag  1020
aacggatttg gaggcattgc caaagactta caagataaag tccttgaaat accaaagtca  1080
agatatagtt cggttgatct tttcttgggt gggtcgaaat ttttcaatag gacttataac  1140
gacacaaatg tacctattaa tgaaaaagta ttaggacgac tactagagaa tgataaggcg  1200
ccactggact atgatcttgc taaacatttt gcgcatctct acataagaga tccagtatct  1260
acattcgaag aactgttgaa tcaggacaac aaaacgtctt caaatcactt tgaaaacatc  1320
caaagtacaa attggcagac attacgtttt aaaccccccca cacaacaagc aaccccggac  1380
aaaaaggatt ctcctggttg gagagtggaa ttcagaccat ttgaagtgca actattagat  1440
tttgagaacg ctgcgtattc cgtgctcata tacttgattg tcgatagcat tttgaccttt  1500
tccgataata ttaacgcata tattcatatg tccaaagtat gggaaaatat gaagatagcc  1560
catcacagag atgctatcct atttgaaaaa tttcattgga aaaaatcatt tcgcaacgac  1620
accgatgtgg aaactgaaga ttattctata agcgagattt ccataatcc agagaatggt  1680
atatttcctc aatttgttac gccaatccta tgccaaaaag ggtttgtaac caaagattgg  1740
aaagaattaa agcattcttc caaacacgag agactatact attatttaaa gctaatttct  1800
gatagagcaa gcggtgaatt gccaacaaca gcaaaattct ttagaaattt tgtactacaa  1860
catccagatt acaaacatga ttcaaaaatt tcaaagtcga tcaattatga tttgctttct  1920
acgtgtgata gacttacccca tttagacgat tcaaaaggtg aattgacatc cttttttagga  1980
gctgaaattg cagaatatgt aaaaaaaaat aagccttcaa tagaaagcaa atgttaa      2037
```

<210> SEQ ID NO 3
<211> LENGTH: 678
<212> TYPE: PRT
<213> ORGANISM: Artificial Sequence
<220> FEATURE:
<223> OTHER INFORMATION: S.cerevisiae GSH1 C86A

<400> SEQUENCE: 3

```
Met Gly Leu Leu Ala Leu Gly Thr Pro Leu Gln Trp Phe Glu Ser Arg
1               5                   10                  15

Thr Tyr Asn Glu His Ile Arg Asp Gly Ile Glu Gln Leu Leu Tyr
            20                  25                  30

Ile Phe Gln Ala Ala Gly Lys Arg Asp Asn Asp Pro Leu Phe Trp Gly
            35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Ala Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
            115                 120                 125

Ala Glu Tyr Lys Leu Ser Glu Tyr Ala Arg Gln Asp Ser Lys Asn Asn
            130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
                180                 185                 190

Arg His Val Arg Phe Pro Asn Leu Thr Ala Ser Ile Arg Thr Arg Arg
                195                 200                 205

Gly Glu Lys Val Cys Met Asn Val Pro Met Tyr Lys Asp Ile Ala Thr
            210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
            275                 280                 285

Phe Ala Pro Ile Met Leu Ala Phe Ser Ala Ala Pro Ala Phe Lys
            290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
            325                 330                 335

Lys Tyr Asn Lys Asn Gly Phe Gly Gly Ile Ala Lys Asp Val Gln Asp
            340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
            370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
            405                 410                 415

Asp Pro Val Ser Thr Phe Glu Glu Leu Leu Asn Gln Asp Asn Lys Thr
```

```
            420             425             430
Ser Ser Asn His Phe Glu Asn Ile Gln Ser Thr Asn Trp Gln Thr Leu
        435             440             445

Arg Phe Lys Pro Pro Thr Gln Gln Ala Thr Pro Asp Lys Lys Asp Ser
450             455             460

Pro Gly Trp Arg Val Glu Phe Arg Pro Phe Glu Val Gln Leu Leu Asp
465             470             475             480

Phe Glu Asn Ala Ala Tyr Ser Val Leu Ile Tyr Leu Ile Val Asp Ser
                485             490             495

Ile Leu Thr Phe Ser Asp Asn Ile Asn Ala Tyr Ile His Met Ser Lys
            500             505             510

Val Trp Glu Asn Met Lys Ile Ala His His Arg Asp Ala Ile Leu Phe
        515             520             525

Glu Lys Phe His Trp Lys Ser Phe Arg Asn Asp Thr Asp Val Glu
    530             535             540

Thr Glu Asp Tyr Ser Ile Ser Glu Ile Phe His Asn Pro Glu Asn Gly
545             550             555             560

Ile Phe Pro Gln Phe Val Thr Pro Ile Leu Cys Gln Lys Gly Phe Val
                565             570             575

Thr Lys Asp Trp Lys Glu Leu Lys His Ser Ser Lys His Glu Arg Leu
            580             585             590

Tyr Tyr Tyr Leu Lys Leu Ile Ser Asp Arg Ala Ser Gly Glu Leu Pro
        595             600             605

Thr Thr Ala Lys Phe Phe Arg Asn Phe Val Leu Gln His Pro Asp Tyr
    610             615             620

Lys His Asp Ser Lys Ile Ser Lys Ser Ile Asn Tyr Asp Leu Leu Ser
625             630             635             640

Thr Cys Asp Arg Leu Thr His Leu Asp Asp Ser Lys Gly Glu Leu Thr
                645             650             655

Ser Phe Leu Gly Ala Glu Ile Ala Glu Tyr Val Lys Lys Asn Lys Pro
            660             665             670

Ser Ile Glu Ser Lys Cys
        675

<210> SEQ ID NO 4
<211> LENGTH: 678
<212> TYPE: PRT
<213> ORGANISM: Artificial Sequence
<220> FEATURE:
<223> OTHER INFORMATION: S.cerevisiae GSH1 C86D

<400> SEQUENCE: 4

Met Gly Leu Leu Ala Leu Gly Thr Pro Leu Gln Trp Phe Glu Ser Arg
1               5               10              15

Thr Tyr Asn Glu His Ile Arg Asp Glu Gly Ile Glu Gln Leu Leu Tyr
            20              25              30

Ile Phe Gln Ala Ala Gly Lys Arg Asp Asn Asp Pro Leu Phe Trp Gly
        35              40              45

Asp Glu Leu Glu Tyr Met Val Val Asp Phe Asp Lys Glu Arg Asn
    50              55              60

Ser Met Leu Asp Val Cys His Asp Lys Ile Leu Thr Glu Leu Asn Met
65              70              75              80

Glu Asp Ser Ser Leu Asp Glu Ala Asn Asp Val Ser Phe His Pro Glu
            85              90              95

Tyr Gly Arg Tyr Met Leu Glu Ala Thr Pro Ala Ser Pro Tyr Leu Asn
```

```
            100                 105                 110
Tyr Val Gly Ser Tyr Val Glu Val Asn Met Gln Lys Arg Arg Ala Ile
            115                 120                 125
Ala Glu Tyr Lys Leu Ser Glu Tyr Ala Arg Gln Asp Ser Lys Asn Asn
            130                 135             140
Leu His Val Gly Ser Arg Ser Val Pro Leu Thr Leu Thr Val Phe Pro
145                 150                 155                 160
Arg Met Gly Cys Pro Asp Phe Ile Asn Ile Lys Asp Pro Trp Asn His
                165                 170                 175
Lys Asn Ala Ala Ser Arg Ser Leu Phe Leu Pro Asp Glu Val Ile Asn
                180                 185                 190
Arg His Val Arg Phe Pro Asn Leu Thr Ala Ser Ile Arg Thr Arg Arg
            195                 200                 205
Gly Glu Lys Val Cys Met Asn Val Pro Met Tyr Lys Asp Ile Ala Thr
        210                 215                 220
Pro Glu Thr Asp Asp Ser Ile Tyr Asp Arg Asp Trp Phe Leu Pro Glu
225                 230                 235                 240
Asp Lys Glu Ala Lys Leu Ala Ser Lys Pro Gly Phe Ile Tyr Met Asp
                245                 250                 255
Ser Met Gly Phe Gly Met Gly Cys Ser Cys Leu Gln Val Thr Phe Gln
                260                 265                 270
Ala Pro Asn Ile Asn Lys Ala Arg Tyr Leu Tyr Asp Ala Leu Val Asn
                275                 280                 285
Phe Ala Pro Ile Met Leu Ala Phe Ser Ala Ala Pro Ala Phe Lys
            290                 295             300
Gly Trp Leu Ala Asp Gln Asp Val Arg Trp Asn Val Ile Ser Gly Ala
305                 310                 315                 320
Val Asp Asp Arg Thr Pro Lys Glu Arg Gly Val Ala Pro Leu Leu Pro
                325                 330                 335
Lys Tyr Asn Lys Asn Gly Phe Gly Gly Ile Ala Lys Asp Val Gln Asp
                340                 345                 350
Lys Val Leu Glu Ile Pro Lys Ser Arg Tyr Ser Ser Val Asp Leu Phe
            355                 360                 365
Leu Gly Gly Ser Lys Phe Phe Asn Arg Thr Tyr Asn Asp Thr Asn Val
            370                 375                 380
Pro Ile Asn Glu Lys Val Leu Gly Arg Leu Leu Glu Asn Asp Lys Ala
385                 390                 395                 400
Pro Leu Asp Tyr Asp Leu Ala Lys His Phe Ala His Leu Tyr Ile Arg
                405                 410                 415
Asp Pro Val Ser Thr Phe Glu Glu Leu Leu Asn Gln Asp Asn Lys Thr
                420                 425                 430
Ser Ser Asn His Phe Glu Asn Ile Gln Ser Thr Asn Trp Gln Thr Leu
            435                 440                 445
Arg Phe Lys Pro Pro Thr Gln Gln Ala Thr Pro Asp Lys Lys Asp Ser
    450                 455                 460
Pro Gly Trp Arg Val Glu Phe Arg Pro Phe Glu Val Gln Leu Leu Asp
465                 470                 475                 480
Phe Glu Asn Ala Ala Tyr Ser Val Leu Ile Tyr Leu Ile Val Asp Ser
                485                 490                 495
Ile Leu Thr Phe Ser Asp Asn Ile Asn Ala Tyr Ile His Met Ser Lys
            500                 505                 510
Val Trp Glu Asn Met Lys Ile Ala His His Arg Asp Ala Ile Leu Phe
            515                 520                 525
```

```
Glu Lys Phe His Trp Lys Lys Ser Phe Arg Asn Asp Thr Asp Val Glu
            530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
            565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
            595                 600                 605

Thr Thr Ala Lys Phe Phe Arg Asn Phe Val Leu Gln His Pro Asp Tyr
            610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
            645                 650                 655

Ser Phe Leu Gly Ala Glu Ile Ala Glu Tyr Val Lys Lys Asn Lys Pro
            660                 665                 670

Ser Ile Glu Ser Lys Cys
            675

<210> SEQ ID NO 5
<211> LENGTH: 678
<212> TYPE: PRT
<213> ORGANISM: Artificial Sequence
<220> FEATURE:
<223> OTHER INFORMATION: S.cerevisiae GSH1 C86E

<400> SEQUENCE: 5

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
            35                  40                  45

Asp Glu Leu Glu Tyr Met Val Val Asp Phe Asp Lys Glu Arg Asn
50                  55                  60

Ser Met Leu Asp Val Cys His Asp Lys Ile Leu Thr Glu Leu Asn Met
65                  70                  75                  80

Glu Asp Ser Ser Leu Glu Glu Ala Asn Asp Val Ser Phe His Pro Glu
            85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
            115                 120                 125

Ala Glu Tyr Lys Leu Ser Glu Tyr Ala Arg Gln Asp Ser Lys Asn Asn
130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
            165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
            195                 200                 205
```

```
Gly Glu Lys Val Cys Met Asn Val Pro Met Tyr Lys Asp Ile Ala Thr
            210                 215                 220
Pro Glu Thr Asp Asp Ser Ile Tyr Asp Arg Asp Trp Phe Leu Pro Glu
225                 230                 235                 240
Asp Lys Glu Ala Lys Leu Ala Ser Lys Pro Gly Phe Ile Tyr Met Asp
                245                 250                 255
Ser Met Gly Phe Gly Met Gly Cys Ser Cys Leu Gln Val Thr Phe Gln
            260                 265                 270
Ala Pro Asn Ile Asn Lys Ala Arg Tyr Leu Tyr Asp Ala Leu Val Asn
            275                 280                 285
Phe Ala Pro Ile Met Leu Ala Phe Ser Ala Ala Pro Ala Phe Lys
290                 295                 300
Gly Trp Leu Ala Asp Gln Asp Val Arg Trp Asn Val Ile Ser Gly Ala
305                 310                 315                 320
Val Asp Asp Arg Thr Pro Lys Glu Arg Gly Val Ala Pro Leu Leu Pro
                325                 330                 335
Lys Tyr Asn Lys Asn Gly Phe Gly Gly Ile Ala Lys Asp Val Gln Asp
            340                 345                 350
Lys Val Leu Glu Ile Pro Lys Ser Arg Tyr Ser Ser Val Asp Leu Phe
            355                 360                 365
Leu Gly Gly Ser Lys Phe Phe Asn Arg Thr Tyr Asn Asp Thr Asn Val
370                 375                 380
Pro Ile Asn Glu Lys Val Leu Gly Arg Leu Leu Glu Asn Asp Lys Ala
385                 390                 395                 400
Pro Leu Asp Tyr Asp Leu Ala Lys His Phe Ala His Leu Tyr Ile Arg
                405                 410                 415
Asp Pro Val Ser Thr Phe Glu Glu Leu Leu Asn Gln Asp Asn Lys Thr
            420                 425                 430
Ser Ser Asn His Phe Glu Asn Ile Gln Ser Thr Asn Trp Gln Thr Leu
            435                 440                 445
Arg Phe Lys Pro Pro Thr Gln Gln Ala Thr Pro Asp Lys Lys Asp Ser
    450                 455                 460
Pro Gly Trp Arg Val Glu Phe Arg Pro Phe Glu Val Gln Leu Leu Asp
465                 470                 475                 480
Phe Glu Asn Ala Ala Tyr Ser Val Leu Ile Tyr Leu Ile Val Asp Ser
                485                 490                 495
Ile Leu Thr Phe Ser Asp Asn Ile Asn Ala Tyr Ile His Met Ser Lys
            500                 505                 510
Val Trp Glu Asn Met Lys Ile Ala His His Arg Asp Ala Ile Leu Phe
            515                 520                 525
Glu Lys Phe His Trp Lys Lys Ser Phe Arg Asn Asp Thr Asp Val Glu
    530                 535                 540
Thr Glu Asp Tyr Ser Ile Ser Glu Ile Phe His Asn Pro Glu Asn Gly
545                 550                 555                 560
Ile Phe Pro Gln Phe Val Thr Pro Ile Leu Cys Gln Lys Gly Phe Val
                565                 570                 575
Thr Lys Asp Trp Lys Glu Leu Lys His Ser Ser Lys His Glu Arg Leu
            580                 585                 590
Tyr Tyr Tyr Leu Lys Leu Ile Ser Asp Arg Ala Ser Gly Glu Leu Pro
            595                 600                 605
Thr Thr Ala Lys Phe Phe Arg Asn Phe Val Leu Gln His Pro Asp Tyr
610                 615                 620
```

```
Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
        675
```

```
<210> SEQ ID NO 6
<211> LENGTH: 678
<212> TYPE: PRT
<213> ORGANISM: Artificial Sequence
<220> FEATURE:
<223> OTHER INFORMATION: S.cerevisiae GSH1 C86F

<400> SEQUENCE: 6

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Phe Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
        275                 280                 285

Phe Ala Pro Ile Met Leu Ala Phe Ser Ala Ala Pro Ala Phe Lys
290                 295                 300
```

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
            325                 330                 335

Lys Tyr Asn Lys Asn Gly Phe Gly Ile Ala Lys Asp Val Gln Asp
            340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
            405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
            515                 520                 525

Glu Lys Phe His Trp Lys Lys Ser Phe Arg Asn Asp Thr Asp Val Glu
            530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
            565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
            595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
            645                 650                 655

Ser Phe Leu Gly Ala Glu Ile Ala Glu Tyr Val Lys Lys Asn Lys Pro
            660                 665                 670

Ser Ile Glu Ser Lys Cys
        675

<210> SEQ ID NO 7
<211> LENGTH: 678
<212> TYPE: PRT
<213> ORGANISM: Artificial Sequence
<220> FEATURE:
<223> OTHER INFORMATION: S.cerevisiae GSH1 C86G

```
<400> SEQUENCE: 7

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
            35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65              70                  75                  80

Glu Asp Ser Ser Leu Gly Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
            115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
    195                 200                 205

Gly Glu Lys Val Cys Met Asn Val Pro Met Tyr Lys Asp Ile Ala Thr
    210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
            245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
            275                 280                 285

Phe Ala Pro Ile Met Leu Ala Phe Ser Ala Ala Pro Ala Phe Lys
    290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
            325                 330                 335

Lys Tyr Asn Lys Asn Gly Phe Gly Gly Ile Ala Lys Asp Val Gln Asp
            340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
            370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
```

```
                    405                 410                 415

Asp Pro Val Ser Thr Phe Glu Glu Leu Leu Asn Gln Asp Asn Lys Thr
                420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
        450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
                500                 505                 510

Val Trp Glu Asn Met Lys Ile Ala His His Arg Asp Ala Ile Leu Phe
            515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
                630                 635                 640
625

Thr Cys Asp Arg Leu Thr His Leu Asp Asp Ser Lys Gly Glu Leu Thr
            645                 650                 655

Ser Phe Leu Gly Ala Glu Ile Ala Glu Tyr Val Lys Lys Asn Lys Pro
        660                 665                 670

Ser Ile Glu Ser Lys Cys
        675

<210> SEQ ID NO 8
<211> LENGTH: 678
<212> TYPE: PRT
<213> ORGANISM: Artificial Sequence
<220> FEATURE:
<223> OTHER INFORMATION: S.cerevisiae GSH1 C86H

<400> SEQUENCE: 8

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
                20                  25                  30

Ile Phe Gln Ala Ala Gly Lys Arg Asp Asn Asp Pro Leu Phe Trp Gly
            35                  40                  45

Asp Glu Leu Glu Tyr Met Val Val Asp Phe Asp Asp Lys Glu Arg Asn
        50                  55                  60

Ser Met Leu Asp Val Cys His Asp Lys Ile Leu Thr Glu Leu Asn Met
65                  70                  75                  80

Glu Asp Ser Ser Leu His Glu Ala Asn Asp Val Ser Phe His Pro Glu
```

```
                    85                  90                  95
Tyr Gly Arg Tyr Met Leu Glu Ala Thr Pro Ala Ser Pro Tyr Leu Asn
            100                 105                 110
Tyr Val Gly Ser Tyr Val Glu Val Asn Met Gln Lys Arg Arg Ala Ile
            115                 120                 125
Ala Glu Tyr Lys Leu Ser Glu Tyr Ala Arg Gln Asp Ser Lys Asn Asn
130                 135                 140
Leu His Val Gly Ser Arg Ser Val Pro Leu Thr Leu Thr Val Phe Pro
145                 150                 155                 160
Arg Met Gly Cys Pro Asp Phe Ile Asn Ile Lys Asp Pro Trp Asn His
                165                 170                 175
Lys Asn Ala Ala Ser Arg Ser Leu Phe Leu Pro Asp Glu Val Ile Asn
            180                 185                 190
Arg His Val Arg Phe Pro Asn Leu Thr Ala Ser Ile Arg Thr Arg Arg
            195                 200                 205
Gly Glu Lys Val Cys Met Asn Val Pro Met Tyr Lys Asp Ile Ala Thr
        210                 215                 220
Pro Glu Thr Asp Asp Ser Ile Tyr Asp Arg Asp Trp Phe Leu Pro Glu
225                 230                 235                 240
Asp Lys Glu Ala Lys Leu Ala Ser Lys Pro Gly Phe Ile Tyr Met Asp
                245                 250                 255
Ser Met Gly Phe Gly Met Gly Cys Ser Cys Leu Gln Val Thr Phe Gln
            260                 265                 270
Ala Pro Asn Ile Asn Lys Ala Arg Tyr Leu Tyr Asp Ala Leu Val Asn
            275                 280                 285
Phe Ala Pro Ile Met Leu Ala Phe Ser Ala Ala Pro Ala Phe Lys
        290                 295                 300
Gly Trp Leu Ala Asp Gln Asp Val Arg Trp Asn Val Ile Ser Gly Ala
305                 310                 315                 320
Val Asp Asp Arg Thr Pro Lys Glu Arg Gly Val Ala Pro Leu Leu Pro
                325                 330                 335
Lys Tyr Asn Lys Asn Gly Phe Gly Ile Ala Lys Asp Val Gln Asp
            340                 345                 350
Lys Val Leu Glu Ile Pro Lys Ser Arg Tyr Ser Ser Val Asp Leu Phe
            355                 360                 365
Leu Gly Gly Ser Lys Phe Phe Asn Arg Thr Tyr Asn Asp Thr Asn Val
        370                 375                 380
Pro Ile Asn Glu Lys Val Leu Gly Arg Leu Leu Glu Asn Asp Lys Ala
385                 390                 395                 400
Pro Leu Asp Tyr Asp Leu Ala Lys His Phe Ala His Leu Tyr Ile Arg
                405                 410                 415
Asp Pro Val Ser Thr Phe Glu Glu Leu Leu Asn Gln Asp Asn Lys Thr
            420                 425                 430
Ser Ser Asn His Phe Glu Asn Ile Gln Ser Thr Asn Trp Gln Thr Leu
            435                 440                 445
Arg Phe Lys Pro Pro Thr Gln Gln Ala Thr Pro Asp Lys Lys Asp Ser
        450                 455                 460
Pro Gly Trp Arg Val Glu Phe Arg Pro Phe Glu Val Gln Leu Leu Asp
465                 470                 475                 480
Phe Glu Asn Ala Ala Tyr Ser Val Leu Ile Tyr Leu Ile Val Asp Ser
                485                 490                 495
Ile Leu Thr Phe Ser Asp Asn Ile Asn Ala Tyr Ile His Met Ser Lys
            500                 505                 510
```

-continued

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
    610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Ser Lys Gly Glu Leu Thr
                645                 650                 655

Ser Phe Leu Gly Ala Glu Ile Ala Glu Tyr Val Lys Lys Asn Lys Pro
                660                 665                 670

Ser Ile Glu Ser Lys Cys
            675

<210> SEQ ID NO 9
<211> LENGTH: 678
<212> TYPE: PRT
<213> ORGANISM: Artificial Sequence
<220> FEATURE:
<223> OTHER INFORMATION: S.cerevisiae GSH1 C86I

<400> SEQUENCE: 9

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Ile Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

```
Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
        210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                    245                 250                 255

Ser Met Gly Phe Gly Met Gly Cys Ser Cys Leu Gln Val Thr Phe Gln
                260                 265                 270

Ala Pro Asn Ile Asn Lys Ala Arg Tyr Leu Tyr Asp Ala Leu Val Asn
            275                 280                 285

Phe Ala Pro Ile Met Leu Ala Phe Ser Ala Ala Pro Ala Phe Lys
        290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                    325                 330                 335

Lys Tyr Asn Lys Asn Gly Phe Gly Gly Ile Ala Lys Asp Val Gln Asp
                340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
        370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                    405                 410                 415

Asp Pro Val Ser Thr Phe Glu Glu Leu Leu Asn Gln Asp Asn Lys Thr
                420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
        450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                    485                 490                 495

Ile Leu Thr Phe Ser Asp Asn Ile Asn Ala Tyr Ile His Met Ser Lys
                500                 505                 510

Val Trp Glu Asn Met Lys Ile Ala His His Arg Asp Ala Ile Leu Phe
            515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                    565                 570                 575

Thr Lys Asp Trp Lys Glu Leu Lys His Ser Ser Lys His Glu Arg Leu
                580                 585                 590

Tyr Tyr Tyr Leu Lys Leu Ile Ser Asp Arg Ala Ser Gly Glu Leu Pro
            595                 600                 605
```

```
Thr Thr Ala Lys Phe Phe Arg Asn Phe Val Leu Gln His Pro Asp Tyr
    610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
                660                 665                 670

Ser Ile Glu Ser Lys Cys
                675

<210> SEQ ID NO 10
<211> LENGTH: 678
<212> TYPE: PRT
<213> ORGANISM: Artificial Sequence
<220> FEATURE:
<223> OTHER INFORMATION: S.cerevisiae GSH1 C86K

<400> SEQUENCE: 10

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
                20                  25                  30

Ile Phe Gln Ala Ala Gly Lys Arg Asp Asn Asp Pro Leu Phe Trp Gly
            35                  40                  45

Asp Glu Leu Glu Tyr Met Val Val Asp Phe Asp Lys Glu Arg Asn
        50                  55                  60

Ser Met Leu Asp Val Cys His Asp Lys Ile Leu Thr Glu Leu Asn Met
65                  70                  75                  80

Glu Asp Ser Ser Leu Lys Glu Ala Asn Asp Val Ser Phe His Pro Glu
                85                  90                  95

Tyr Gly Arg Tyr Met Leu Glu Ala Thr Pro Ala Ser Pro Tyr Leu Asn
                100                 105                 110

Tyr Val Gly Ser Tyr Val Glu Val Asn Met Gln Lys Arg Arg Ala Ile
            115                 120                 125

Ala Glu Tyr Lys Leu Ser Glu Tyr Ala Arg Gln Asp Ser Lys Asn Asn
        130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
                180                 185                 190

Arg His Val Arg Phe Pro Asn Leu Thr Ala Ser Ile Arg Thr Arg Arg
            195                 200                 205

Gly Glu Lys Val Cys Met Asn Val Pro Met Tyr Lys Asp Ile Ala Thr
        210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
                260                 265                 270

Ala Pro Asn Ile Asn Lys Ala Arg Tyr Leu Tyr Asp Ala Leu Val Asn
            275                 280                 285
```

Phe Ala Pro Ile Met Leu Ala Phe Ser Ala Ala Pro Ala Phe Lys
    290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Gly Ile Ala Lys Asp Val Gln Asp
                340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                405                 410                 415

Asp Pro Val Ser Thr Phe Glu Glu Leu Leu Asn Gln Asp Asn Lys Thr
                420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
            595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
            675

<210> SEQ ID NO 11
<211> LENGTH: 678
<212> TYPE: PRT

<213> ORGANISM: Artificial Sequence
<220> FEATURE:
<223> OTHER INFORMATION: S.cerevisiae GSH1 C86L

<400> SEQUENCE: 11

```
Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Leu Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
    210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
        275                 280                 285

Phe Ala Pro Ile Met Leu Ala Phe Ser Ala Ala Pro Ala Phe Lys
    290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Ile Ala Lys Asp Val Gln Asp
            340                 345                 350

Lys Val Leu Glu Ile Pro Lys Ser Arg Tyr Ser Ser Val Asp Leu Phe
        355                 360                 365

Leu Gly Gly Ser Lys Phe Phe Asn Arg Thr Tyr Asn Asp Thr Asn Val
    370                 375                 380

Pro Ile Asn Glu Lys Val Leu Gly Arg Leu Leu Glu Asn Asp Lys Ala
```

```
            385                 390                 395                 400

Pro Leu Asp Tyr Asp Leu Ala Lys His Phe Ala His Leu Tyr Ile Arg
                    405                 410                 415

Asp Pro Val Ser Thr Phe Glu Glu Leu Leu Asn Gln Asp Asn Lys Thr
                420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
    450                 455                 460

Pro Gly Trp Arg Val Glu Phe Arg Pro Phe Glu Val Gln Leu Leu Asp
    465                 470                 475                 480

Phe Glu Asn Ala Ala Tyr Ser Val Leu Ile Tyr Leu Ile Val Asp Ser
                        485                 490                 495

Ile Leu Thr Phe Ser Asp Asn Ile Asn Ala Tyr Ile His Met Ser Lys
                    500                 505                 510

Val Trp Glu Asn Met Lys Ile Ala His His Arg Asp Ala Ile Leu Phe
                515                 520                 525

Glu Lys Phe His Trp Lys Lys Ser Phe Arg Asn Asp Thr Asp Val Glu
    530                 535                 540

Thr Glu Asp Tyr Ser Ile Ser Glu Ile Phe His Asn Pro Glu Asn Gly
    545                 550                 555                 560

Ile Phe Pro Gln Phe Val Thr Pro Ile Leu Cys Gln Lys Gly Phe Val
                        565                 570                 575

Thr Lys Asp Trp Lys Glu Leu Lys His Ser Ser Lys His Glu Arg Leu
                    580                 585                 590

Tyr Tyr Tyr Leu Lys Leu Ile Ser Asp Arg Ala Ser Gly Glu Leu Pro
                595                 600                 605

Thr Thr Ala Lys Phe Phe Arg Asn Phe Val Leu Gln His Pro Asp Tyr
                    610                 615                 620

Lys His Asp Ser Lys Ile Ser Lys Ser Ile Asn Tyr Asp Leu Leu Ser
    625                 630                 635                 640

Thr Cys Asp Arg Leu Thr His Leu Asp Asp Ser Lys Gly Glu Leu Thr
                        645                 650                 655

Ser Phe Leu Gly Ala Glu Ile Ala Glu Tyr Val Lys Lys Asn Lys Pro
                    660                 665                 670

Ser Ile Glu Ser Lys Cys
                675

<210> SEQ ID NO 12
<211> LENGTH: 678
<212> TYPE: PRT
<213> ORGANISM: Artificial Sequence
<220> FEATURE:
<223> OTHER INFORMATION: S.cerevisiae GSH1 C86M

<400> SEQUENCE: 12

Met Gly Leu Leu Ala Leu Gly Thr Pro Leu Gln Trp Phe Glu Ser Arg
    1               5                   10                  15

Thr Tyr Asn Glu His Ile Arg Asp Glu Gly Ile Glu Gln Leu Leu Tyr
                20                  25                  30

Ile Phe Gln Ala Ala Gly Lys Arg Asp Asn Asp Pro Leu Phe Trp Gly
                35                  40                  45

Asp Glu Leu Glu Tyr Met Val Val Asp Phe Asp Lys Glu Arg Asn
            50                  55                  60

Ser Met Leu Asp Val Cys His Asp Lys Ile Leu Thr Glu Leu Asn Met
```

-continued

```
         65                  70                  75                  80
Glu Asp Ser Ser Leu Met Glu Ala Asn Asp Val Ser Phe His Pro Glu
                     85                  90                  95
Tyr Gly Arg Tyr Met Leu Glu Ala Thr Pro Ala Ser Pro Tyr Leu Asn
                100                 105                 110
Tyr Val Gly Ser Tyr Val Glu Val Asn Met Gln Lys Arg Arg Ala Ile
                115                 120                 125
Ala Glu Tyr Lys Leu Ser Glu Tyr Ala Arg Gln Asp Ser Lys Asn Asn
            130                 135                 140
Leu His Val Gly Ser Arg Ser Val Pro Leu Thr Leu Thr Val Phe Pro
145                 150                 155                 160
Arg Met Gly Cys Pro Asp Phe Ile Asn Ile Lys Asp Pro Trp Asn His
                165                 170                 175
Lys Asn Ala Ala Ser Arg Ser Leu Phe Leu Pro Asp Glu Val Ile Asn
                180                 185                 190
Arg His Val Arg Phe Pro Asn Leu Thr Ala Ser Ile Arg Thr Arg Arg
                195                 200                 205
Gly Glu Lys Val Cys Met Asn Val Pro Met Tyr Lys Asp Ile Ala Thr
            210                 215                 220
Pro Glu Thr Asp Asp Ser Ile Tyr Asp Arg Asp Trp Phe Leu Pro Glu
225                 230                 235                 240
Asp Lys Glu Ala Lys Leu Ala Ser Lys Pro Gly Phe Ile Tyr Met Asp
                245                 250                 255
Ser Met Gly Phe Gly Met Gly Cys Ser Cys Leu Gln Val Thr Phe Gln
                260                 265                 270
Ala Pro Asn Ile Asn Lys Ala Arg Tyr Leu Tyr Asp Ala Leu Val Asn
            275                 280                 285
Phe Ala Pro Ile Met Leu Ala Phe Ser Ala Ala Pro Ala Phe Lys
290                 295                 300
Gly Trp Leu Ala Asp Gln Asp Val Arg Trp Asn Val Ile Ser Gly Ala
305                 310                 315                 320
Val Asp Asp Arg Thr Pro Lys Glu Arg Gly Val Ala Pro Leu Leu Pro
                325                 330                 335
Lys Tyr Asn Lys Asn Gly Phe Gly Gly Ile Ala Lys Asp Val Gln Asp
                340                 345                 350
Lys Val Leu Glu Ile Pro Lys Ser Arg Tyr Ser Ser Val Asp Leu Phe
            355                 360                 365
Leu Gly Gly Ser Lys Phe Phe Asn Arg Thr Tyr Asn Asp Thr Asn Val
            370                 375                 380
Pro Ile Asn Glu Lys Val Leu Gly Arg Leu Leu Glu Asn Asp Lys Ala
385                 390                 395                 400
Pro Leu Asp Tyr Asp Leu Ala Lys His Phe Ala His Leu Tyr Ile Arg
                405                 410                 415
Asp Pro Val Ser Thr Phe Glu Glu Leu Leu Asn Gln Asp Asn Lys Thr
                420                 425                 430
Ser Ser Asn His Phe Glu Asn Ile Gln Ser Thr Asn Trp Gln Thr Leu
            435                 440                 445
Arg Phe Lys Pro Pro Thr Gln Gln Ala Thr Pro Asp Lys Lys Asp Ser
            450                 455                 460
Pro Gly Trp Arg Val Glu Phe Arg Pro Phe Glu Val Gln Leu Leu Asp
465                 470                 475                 480
Phe Glu Asn Ala Ala Tyr Ser Val Leu Ile Tyr Leu Ile Val Asp Ser
                485                 490                 495
```

```
Ile Leu Thr Phe Ser Asp Asn Ile Asn Ala Tyr Ile His Met Ser Lys
                500                 505                 510

Val Trp Glu Asn Met Lys Ile Ala His His Arg Asp Ala Ile Leu Phe
            515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
        675

<210> SEQ ID NO 13
<211> LENGTH: 678
<212> TYPE: PRT
<213> ORGANISM: Artificial Sequence
<220> FEATURE:
<223> OTHER INFORMATION: S.cerevisiae GSH1 C86N

<400> SEQUENCE: 13

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Asn Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175
```

-continued

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
            195                 200                 205

Gly Glu Lys Val Cys Met Asn Val Pro Met Tyr Lys Asp Ile Ala Thr
210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
            245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
            275                 280                 285

Phe Ala Pro Ile Met Leu Ala Phe Ser Ala Ala Pro Ala Phe Lys
            290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
            325                 330                 335

Lys Tyr Asn Lys Asn Gly Phe Gly Ile Ala Lys Asp Val Gln Asp
            340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
            405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
            485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
            515                 520                 525

Glu Lys Phe His Trp Lys Lys Ser Phe Arg Asn Asp Thr Asp Val Glu
            530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
            565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
            595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Ser Lys Gly Glu Leu Thr
            645                 650                 655

Ser Phe Leu Gly Ala Glu Ile Ala Glu Tyr Val Lys Lys Asn Lys Pro
            660                 665                 670

Ser Ile Glu Ser Lys Cys
            675

<210> SEQ ID NO 14
<211> LENGTH: 678
<212> TYPE: PRT
<213> ORGANISM: Artificial Sequence
<220> FEATURE:
<223> OTHER INFORMATION: S.cerevisiae GSH1 C86P

<400> SEQUENCE: 14

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
            35                  40                  45

Asp Glu Leu Glu Tyr Met Val Val Asp Phe Asp Asp Lys Glu Arg Asn
50                  55                  60

Ser Met Leu Asp Val Cys His Asp Lys Ile Leu Thr Glu Leu Asn Met
65                  70                  75                  80

Glu Asp Ser Ser Leu Pro Glu Ala Asn Asp Val Ser Phe His Pro Glu
            85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
            115                 120                 125

Ala Glu Tyr Lys Leu Ser Glu Tyr Ala Arg Gln Asp Ser Lys Asn Asn
130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
            165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
            195                 200                 205

Gly Glu Lys Val Cys Met Asn Val Pro Met Tyr Lys Asp Ile Ala Thr
210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
            245                 250                 255

Ser Met Gly Phe Gly Met Gly Cys Ser Cys Leu Gln Val Thr Phe Gln
            260                 265                 270

```
Ala Pro Asn Ile Asn Lys Ala Arg Tyr Leu Tyr Asp Ala Leu Val Asn
            275                 280                 285

Phe Ala Pro Ile Met Leu Ala Phe Ser Ala Ala Pro Ala Phe Lys
290                 295                 300

Gly Trp Leu Ala Asp Gln Asp Val Arg Trp Asn Val Ile Ser Gly Ala
305                     310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Gly Ile Ala Lys Asp Val Gln Asp
            340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
        370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
        435                 440                 445

Arg Phe Lys Pro Pro Thr Gln Gln Ala Thr Pro Asp Lys Lys Asp Ser
    450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
    530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
    610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
            675
```

-continued

<210> SEQ ID NO 15
<211> LENGTH: 678
<212> TYPE: PRT
<213> ORGANISM: Artificial Sequence
<220> FEATURE:
<223> OTHER INFORMATION: S.cerevisiae GSH1 C86Q

<400> SEQUENCE: 15

```
Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Gln Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
    210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
        275                 280                 285

Phe Ala Pro Ile Met Leu Ala Phe Ser Ala Ala Pro Ala Phe Lys
    290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Ile Ala Lys Asp Val Gln Asp
            340                 345                 350

Lys Val Leu Glu Ile Pro Lys Ser Arg Tyr Ser Ser Val Asp Leu Phe
        355                 360                 365

Leu Gly Gly Ser Lys Phe Phe Asn Arg Thr Tyr Asn Asp Thr Asn Val
```

```
            370                 375                 380
Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                405                 410                 415

Asp Pro Val Ser Thr Phe Glu Glu Leu Leu Asn Gln Asp Asn Lys Thr
                420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
        450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
                500                 505                 510

Val Trp Glu Asn Met Lys Ile Ala His His Arg Asp Ala Ile Leu Phe
            515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
                580                 585                 590

Tyr Tyr Tyr Leu Lys Leu Ile Ser Asp Arg Ala Ser Gly Glu Leu Pro
            595                 600                 605

Thr Thr Ala Lys Phe Phe Arg Asn Phe Val Leu Gln His Pro Asp Tyr
        610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
                660                 665                 670

Ser Ile Glu Ser Lys Cys
            675

<210> SEQ ID NO 16
<211> LENGTH: 678
<212> TYPE: PRT
<213> ORGANISM: Artificial Sequence
<220> FEATURE:
<223> OTHER INFORMATION: S.cerevisiae GSH1 C86R

<400> SEQUENCE: 16

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
                20                  25                  30

Ile Phe Gln Ala Ala Gly Lys Arg Asp Asn Asp Pro Leu Phe Trp Gly
            35                  40                  45

Asp Glu Leu Glu Tyr Met Val Val Asp Phe Asp Asp Lys Glu Arg Asn
```

```
                 50                  55                  60
Ser Met Leu Asp Val Cys His Asp Lys Ile Leu Thr Glu Leu Asn Met
 65                  70                  75                  80

Glu Asp Ser Ser Leu Arg Glu Ala Asn Asp Val Ser Phe His Pro Glu
                 85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
            115                 120                 125

Ala Glu Tyr Lys Leu Ser Glu Tyr Ala Arg Gln Asp Ser Lys Asn Asn
130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
            165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
            195                 200                 205

Gly Glu Lys Val Cys Met Asn Val Pro Met Tyr Lys Asp Ile Ala Thr
210                 215                 220

Pro Glu Thr Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
            245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
            275                 280                 285

Phe Ala Pro Ile Met Leu Ala Phe Ser Ala Ala Pro Ala Phe Lys
290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
            325                 330                 335

Lys Tyr Asn Lys Asn Gly Phe Gly Gly Ile Ala Lys Asp Val Gln Asp
            340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
            405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
450                 455                 460

Pro Gly Trp Arg Val Glu Phe Arg Pro Phe Glu Val Gln Leu Leu Asp
465                 470                 475                 480
```

```
Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
    530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
    610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
        675

<210> SEQ ID NO 17
<211> LENGTH: 678
<212> TYPE: PRT
<213> ORGANISM: Artificial Sequence
<220> FEATURE:
<223> OTHER INFORMATION: S.cerevisiae GSH1 C86S

<400> SEQUENCE: 17

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Ser Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160
```

```
Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
    210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
        275                 280                 285

Phe Ala Pro Ile Met Leu Ala Phe Ser Ala Ala Ala Pro Ala Phe Lys
    290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Gly Ile Ala Lys Asp Val Gln Asp
            340                 345                 350

Lys Val Leu Glu Ile Pro Lys Ser Arg Tyr Ser Ser Val Asp Leu Phe
        355                 360                 365

Leu Gly Gly Ser Lys Phe Phe Asn Arg Thr Tyr Asn Asp Thr Asn Val
    370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
        435                 440                 445

Arg Phe Lys Pro Pro Thr Gln Gln Ala Thr Pro Asp Lys Lys Asp Ser
    450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
    530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575
```

```
Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
    595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
        675

<210> SEQ ID NO 18
<211> LENGTH: 678
<212> TYPE: PRT
<213> ORGANISM: Artificial Sequence
<220> FEATURE:
<223> OTHER INFORMATION: S.cerevisiae GSH1 C86T

<400> SEQUENCE: 18

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Thr Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
    210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255
```

```
Ser Met Gly Phe Gly Met Gly Cys Ser Cys Leu Gln Val Thr Phe Gln
            260             265                 270

Ala Pro Asn Ile Asn Lys Ala Arg Tyr Leu Tyr Asp Ala Leu Val Asn
        275                 280                 285

Phe Ala Pro Ile Met Leu Ala Phe Ser Ala Ala Pro Ala Phe Lys
        290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Ile Ala Lys Asp Val Gln Asp
        340                 345                 350

Lys Val Leu Glu Ile Pro Lys Ser Arg Tyr Ser Val Asp Leu Phe
        355                 360                 365

Leu Gly Gly Ser Lys Phe Phe Asn Arg Thr Tyr Asn Asp Thr Asn Val
        370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
            405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
            485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
        530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
            565                 570                 575

Thr Lys Asp Trp Lys Glu Leu Lys His Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
            645                 650                 655

Ser Phe Leu Gly Ala Glu Ile Ala Glu Tyr Val Lys Lys Asn Lys Pro
            660                 665                 670

Ser Ile Glu Ser Lys Cys
```

<210> SEQ ID NO 19
<211> LENGTH: 678
<212> TYPE: PRT
<213> ORGANISM: Artificial Sequence
<220> FEATURE:
<223> OTHER INFORMATION: S.cerevisiae GSH1 C86V

<400> SEQUENCE: 19

```
Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Val Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
        195                 200                 205

Gly Glu Lys Val Cys Met Asn Val Pro Met Tyr Lys Asp Ile Ala Thr
210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
        275                 280                 285

Phe Ala Pro Ile Met Leu Ala Phe Ser Ala Ala Pro Ala Phe Lys
290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Gly Ile Ala Lys Asp Val Gln Asp
            340                 345                 350

Lys Val Leu Glu Ile Pro Lys Ser Arg Tyr Ser Ser Val Asp Leu Phe
```

```
            355                 360                 365
Leu Gly Gly Ser Lys Phe Phe Asn Arg Thr Tyr Asn Asp Thr Asn Val
    370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
        435                 440                 445

Arg Phe Lys Pro Pro Thr Gln Gln Ala Thr Pro Asp Lys Lys Asp Ser
    450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
    530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
    610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
        675

<210> SEQ ID NO 20
<211> LENGTH: 678
<212> TYPE: PRT
<213> ORGANISM: Artificial Sequence
<220> FEATURE:
<223> OTHER INFORMATION: S.cerevisiae GSH1 C86W

<400> SEQUENCE: 20

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
```

```
                35                  40                  45
Asp Glu Leu Glu Tyr Met Val Val Asp Phe Asp Asp Lys Glu Arg Asn
 50                  55                  60

Ser Met Leu Asp Val Cys His Asp Lys Ile Leu Thr Glu Leu Asn Met
 65                  70                  75                  80

Glu Asp Ser Ser Leu Trp Glu Ala Asn Asp Val Ser Phe His Pro Glu
                 85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
            115                 120                 125

Ala Glu Tyr Lys Leu Ser Glu Tyr Ala Arg Gln Asp Ser Lys Asn Asn
            130                 135                 140

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
                165                 170                 175

Lys Asn Ala Ala Ser Arg Ser Leu Phe Leu Pro Asp Glu Val Ile Asn
            180                 185                 190

Arg His Val Arg Phe Pro Asn Leu Thr Ala Ser Ile Arg Thr Arg Arg
            195                 200                 205

Gly Glu Lys Val Cys Met Asn Val Pro Met Tyr Lys Asp Ile Ala Thr
210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
                245                 250                 255

Ser Met Gly Phe Gly Met Gly Cys Ser Cys Leu Gln Val Thr Phe Gln
            260                 265                 270

Ala Pro Asn Ile Asn Lys Ala Arg Tyr Leu Tyr Asp Ala Leu Val Asn
            275                 280                 285

Phe Ala Pro Ile Met Leu Ala Phe Ser Ala Ala Pro Ala Phe Lys
            290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
                325                 330                 335

Lys Tyr Asn Lys Asn Gly Phe Gly Gly Ile Ala Lys Asp Val Gln Asp
            340                 345                 350

Lys Val Leu Glu Ile Pro Lys Ser Arg Tyr Ser Ser Val Asp Leu Phe
            355                 360                 365

Leu Gly Gly Ser Lys Phe Phe Asn Arg Thr Tyr Asn Asp Thr Asn Val
            370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
                405                 410                 415

Asp Pro Val Ser Thr Phe Glu Glu Leu Leu Asn Gln Asp Asn Lys Thr
            420                 425                 430

Ser Ser Asn His Phe Glu Asn Ile Gln Ser Thr Asn Trp Gln Thr Leu
            435                 440                 445

Arg Phe Lys Pro Pro Thr Gln Gln Ala Thr Pro Asp Lys Lys Asp Ser
450                 455                 460
```

```
Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
                485                 490                 495

Ile Leu Thr Phe Ser Asp Asn Ile Asn Ala Tyr Ile His Met Ser Lys
            500                 505                 510

Val Trp Glu Asn Met Lys Ile Ala His His Arg Asp Ala Ile Leu Phe
        515                 520                 525

Glu Lys Phe His Trp Lys Lys Ser Phe Arg Asn Asp Thr Asp Val Glu
    530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
                565                 570                 575

Thr Lys Asp Trp Lys Glu Leu Lys His Ser Ser Lys His Glu Arg Leu
            580                 585                 590

Tyr Tyr Tyr Leu Lys Leu Ile Ser Asp Arg Ala Ser Gly Glu Leu Pro
        595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
        675

<210> SEQ ID NO 21
<211> LENGTH: 678
<212> TYPE: PRT
<213> ORGANISM: Artificial Sequence
<220> FEATURE:
<223> OTHER INFORMATION: S.cerevisiae GSH1 C86Y

<400> SEQUENCE: 21

Met Gly Leu Leu Ala Leu Gly Thr Pro Leu Gln Trp Phe Glu Ser Arg
1               5                   10                  15

Thr Tyr Asn Glu His Ile Arg Asp Glu Gly Ile Glu Gln Leu Leu Tyr
            20                  25                  30

Ile Phe Gln Ala Ala Gly Lys Arg Asp Asn Asp Pro Leu Phe Trp Gly
        35                  40                  45

Asp Glu Leu Glu Tyr Met Val Val Asp Phe Asp Asp Lys Glu Arg Asn
    50                  55                  60

Ser Met Leu Asp Val Cys His Asp Lys Ile Leu Thr Glu Leu Asn Met
65                  70                  75                  80

Glu Asp Ser Ser Leu Tyr Glu Ala Asn Asp Val Ser Phe His Pro Glu
                85                  90                  95

Tyr Gly Arg Tyr Met Leu Glu Ala Thr Pro Ala Ser Pro Tyr Leu Asn
            100                 105                 110

Tyr Val Gly Ser Tyr Val Glu Val Asn Met Gln Lys Arg Arg Ala Ile
        115                 120                 125

Ala Glu Tyr Lys Leu Ser Glu Tyr Ala Arg Gln Asp Ser Lys Asn Asn
    130                 135                 140
```

Leu His Val Gly Ser Arg Ser Val Pro Leu Thr Leu Thr Val Phe Pro
145                 150                 155                 160

Arg Met Gly Cys Pro Asp Phe Ile Asn Ile Lys Asp Pro Trp Asn His
            165                 170                 175

Lys Asn Ala Ala Ser Arg Ser Leu Phe Leu Pro Asp Glu Val Ile Asn
        180                 185                 190

Arg His Val Arg Phe Pro Asn Leu Thr Ala Ser Ile Arg Thr Arg Arg
    195                 200                 205

Gly Glu Lys Val Cys Met Asn Val Pro Met Tyr Lys Asp Ile Ala Thr
210                 215                 220

Pro Glu Thr Asp Asp Ser Ile Tyr Asp Arg Asp Trp Phe Leu Pro Glu
225                 230                 235                 240

Asp Lys Glu Ala Lys Leu Ala Ser Lys Pro Gly Phe Ile Tyr Met Asp
            245                 250                 255

Ser Met Gly Phe Gly Met Gly Cys Ser Cys Leu Gln Val Thr Phe Gln
        260                 265                 270

Ala Pro Asn Ile Asn Lys Ala Arg Tyr Leu Tyr Asp Ala Leu Val Asn
    275                 280                 285

Phe Ala Pro Ile Met Leu Ala Phe Ser Ala Ala Ala Pro Ala Phe Lys
290                 295                 300

Gly Trp Leu Ala Asp Gln Asp Val Arg Trp Asn Val Ile Ser Gly Ala
305                 310                 315                 320

Val Asp Asp Arg Thr Pro Lys Glu Arg Gly Val Ala Pro Leu Leu Pro
            325                 330                 335

Lys Tyr Asn Lys Asn Gly Phe Gly Ile Ala Lys Asp Val Gln Asp
        340                 345                 350

Lys Val Leu Glu Ile Pro Lys Ser Arg Tyr Ser Ser Val Asp Leu Phe
    355                 360                 365

Leu Gly Gly Ser Lys Phe Phe Asn Arg Thr Tyr Asn Asp Thr Asn Val
370                 375                 380

Pro Ile Asn Glu Lys Val Leu Gly Arg Leu Leu Glu Asn Asp Lys Ala
385                 390                 395                 400

Pro Leu Asp Tyr Asp Leu Ala Lys His Phe Ala His Leu Tyr Ile Arg
            405                 410                 415

Asp Pro Val Ser Thr Phe Glu Glu Leu Leu Asn Gln Asp Asn Lys Thr
        420                 425                 430

Ser Ser Asn His Phe Glu Asn Ile Gln Ser Thr Asn Trp Gln Thr Leu
    435                 440                 445

Arg Phe Lys Pro Pro Thr Gln Gln Ala Thr Pro Asp Lys Lys Asp Ser
    450                 455                 460

Pro Gly Trp Arg Val Glu Phe Arg Pro Phe Glu Val Gln Leu Leu Asp
465                 470                 475                 480

Phe Glu Asn Ala Ala Tyr Ser Val Leu Ile Tyr Leu Ile Val Asp Ser
            485                 490                 495

Ile Leu Thr Phe Ser Asp Asn Ile Asn Ala Tyr Ile His Met Ser Lys
        500                 505                 510

Val Trp Glu Asn Met Lys Ile Ala His His Arg Asp Ala Ile Leu Phe
    515                 520                 525

Glu Lys Phe His Trp Lys Lys Ser Phe Arg Asn Asp Thr Asp Val Glu
    530                 535                 540

Thr Glu Asp Tyr Ser Ile Ser Glu Ile Phe His Asn Pro Glu Asn Gly
545                 550                 555                 560

Ile Phe Pro Gln Phe Val Thr Pro Ile Leu Cys Gln Lys Gly Phe Val
            565                 570                 575

Thr Lys Asp Trp Lys Glu Leu Lys His Ser Ser Lys His Glu Arg Leu
        580                 585                 590

Tyr Tyr Tyr Leu Lys Leu Ile Ser Asp Arg Ala Ser Gly Glu Leu Pro
    595                 600                 605

Thr Thr Ala Lys Phe Phe Arg Asn Phe Val Leu Gln His Pro Asp Tyr
610                 615                 620

Lys His Asp Ser Lys Ile Ser Lys Ser Ile Asn Tyr Asp Leu Leu Ser
625                 630                 635                 640

Thr Cys Asp Arg Leu Thr His Leu Asp Asp Ser Lys Gly Glu Leu Thr
                645                 650                 655

Ser Phe Leu Gly Ala Glu Ile Ala Glu Tyr Val Lys Lys Asn Lys Pro
            660                 665                 670

Ser Ile Glu Ser Lys Cys
        675

<210> SEQ ID NO 22
<211> LENGTH: 33
<212> TYPE: DNA
<213> ORGANISM: Artificial Sequence
<220> FEATURE:
<223> OTHER INFORMATION: F_BamHI_GSH1

<400> SEQUENCE: 22
ggtaggatcc atgggactct agctttggg cac                                33

<210> SEQ ID NO 23
<211> LENGTH: 25
<212> TYPE: DNA
<213> ORGANISM: Artificial Sequence
<220> FEATURE:
<223> OTHER INFORMATION: R_GSH1_C86R

<400> SEQUENCE: 23
ttagcctccc taagggacga atcct                                         25

<210> SEQ ID NO 24
<211> LENGTH: 25
<212> TYPE: DNA
<213> ORGANISM: Artificial Sequence
<220> FEATURE:
<223> OTHER INFORMATION: F_GSH1_C86R

<400> SEQUENCE: 24
cgtcccttag ggaggctaac gatgt                                         25

<210> SEQ ID NO 25
<211> LENGTH: 35
<212> TYPE: DNA
<213> ORGANISM: Artificial Sequence
<220> FEATURE:
<223> OTHER INFORMATION: R_XhoI_GSH1

<400> SEQUENCE: 25
atgactcgag ttaacatttg ctttctattg aaggc                              35

<210> SEQ ID NO 26
<211> LENGTH: 33
<212> TYPE: DNA
<213> ORGANISM: Artificial Sequence
<220> FEATURE:
<223> OTHER INFORMATION: F_SpeI_GSH1_DW

```
<400> SEQUENCE: 26
tagaactagt actcctttta tttcggttgt gaa                              33

<210> SEQ ID NO 27
<211> LENGTH: 35
<212> TYPE: DNA
<213> ORGANISM: Artificial Sequence
<220> FEATURE:
<223> OTHER INFORMATION: R_NcoI_GSH1_DW

<400> SEQUENCE: 27
gctgccatgg gaatagtgtg aaccgataac tgtgt                            35

<210> SEQ ID NO 28
<211> LENGTH: 27
<212> TYPE: DNA
<213> ORGANISM: Artificial Sequence
<220> FEATURE:
<223> OTHER INFORMATION: R_AL killer

<400> SEQUENCE: 28
gagcaatgaa cccaataacg aaatctt                                     27

<210> SEQ ID NO 29
<211> LENGTH: 24
<212> TYPE: DNA
<213> ORGANISM: Artificial Sequence
<220> FEATURE:
<223> OTHER INFORMATION: F_BR killer

<400> SEQUENCE: 29
cttgacgttc gttcgactga tgag                                        24
```

GLUTAMATE-CYSTEINE LIGASE VARIANT AND METHOD OF PRODUCING GLUTATHIONE USING THE SAME

A computer readable text file, entitled "SequenceListing.txt," created on or about Feb. 8, 2023 with a file size of 122,184 bytes contains the sequence listing for this application and is hereby incorporated by reference in its entirety.

TECHNICAL FIELD

The present disclosure relates a novel glutamate-cysteine ligase variant and a method producing glutathione using the same.

BACKGROUND ART

As an organic sulfur compound commonly present in most cells, glutathione (GSH) is a tripeptide composed of three amino acids: glycine, glutamate, and cysteine.

Glutathione is present in the living body in a reduced form of glutathione (GSH) and in an oxidized form of glutathione (GSSG). The reduced form of glutathione (GSH), present in a relatively high proportion under normal circumstances, is mainly distributed in the liver and skin cells in the human body and has important roles of an antioxidant function in decomposing and removing reactive oxygen, a detoxification function in removing xenobiotic compounds such as toxic substances, and a whitening function in inhibiting melanin production.

Since glutathione production gradually decreases as the aging process progresses, and a decrease in production of glutathione, which has important roles in antioxidant and detoxification functions, promotes accumulation of reactive oxygen, which is a main cause of aging, there is a need to supply glutathione from the outside (Sipes I G et al., "The role of glutathione in the toxicity of xenobiotic compounds: metabolic activation of 1,2-dibromoethane by glutathione", *Adv Exp Med Biol.* 1986; 197:457-67).

Glutathione, which has various functions as described above, has drawn attention as a substance in various fields such as pharmaceuticals, health functional foods, and cosmetics, and is also used to manufacture taste ingredients and food and feed additives. It is known that glutathione has great effects on enriching the taste of a raw ingredient and maintaining rich flavors and may be used, alone or in combination with other substances, as a kokumi flavor enhancer. In general, kokumi substances are known to have richer flavors than umami substances, such as known nucleic acids and monosodium glutamate (MSG), and to be generated by protein decomposition during ripening.

Although there is a growing demand for glutathione for application in various fields, the market therefor is not activated due to high costs for industrial production of glutathione since processes of synthesizing enzymes therefor have not been commercialized due to high production costs, and yields of methods of culturing microorganisms and extracting glutathione therefrom are low.

DISCLOSURE

Technical Problem

As a result of intensive efforts to solve the above-described problems, the present inventors have developed a novel glutamate cysteine ligase variant and found a significant increase in the glutathione producing ability of strains into which the novel glutamate-cysteine ligase is introduced, thereby completing the present disclosure.

Technical Solution

The present disclosure provides a glutamate-cysteine ligase variant in which an amino acid corresponding to the $86^{th}$ position from the N-terminus of an amino acid sequence of SEQ ID NO: 1 is substituted with a different amino acid.

The present disclosure provides a polynucleotide encoding the variant and a vector including the same.

The present disclosure provides a microorganism producing glutathione by including at least one of: the variant; the polynucleotide encoding the variant; and the vector including the polynucleotide.

The present disclosure provides a method of producing glutathione including culturing the microorganism.

Advantageous Effects

The novel glutamate cysteine ligase variant of the present disclosure significantly increases glutathione production and thus may be used in production of glutathione with a high yield. Since yeasts producing glutathione with high yields, dried products, extracts, cultures, and lysates thereof, and produced glutathione have antioxidant, detoxification, and immunity enhancing effects, they may be efficiently used in cosmetic compositions, food compositions, feed compositions, and pharmaceutical compositions and preparation thereof.

BEST MODE

The present disclosure will be described in detail. Meanwhile, each description and embodiment disclosed in the present disclosure may be applied to herein to different descriptions and embodiments. In other words, all combinations of various components disclosed in the present disclosure are included within the scope of the present disclosure. Furthermore, the scope of the present disclosure should not be limited by the descriptions provided below.

Those skilled in the art will recognize or be able to ascertain, using no more than routine experimentation, many equivalents to specific embodiments of the present disclosure. Such equivalents are intended to be encompassed in the scope of the following claims.

An aspect of the present disclosure provides a glutamate-cysteine ligase variant in which an amino acid corresponding to the $86^{th}$ position from the N-terminus of an amino acid sequence of SEQ ID NO: 1 is substituted with a different amino acid.

The variant may be a glutamate-cysteine ligase variant including at least one amino acid substitution in the amino acid sequence of SEQ ID NO: 1, wherein the substitution includes a substitution of the amino acid corresponding to the $86^{th}$ position from the N-terminus of the SEQ ID NO: 1 with a different amino acid.

Specifically, the variant may be a protein variant in which the $86^{th}$ amino acid from the N-terminus of the amino acid sequence of SEQ ID NO: 1 is substituted with a different amino acid.

The "glutamate-cysteine ligase (GCL)" of the present disclosure is an enzyme also referred to as "glutamate-cysteine linking enzyme" or "gamma-glutamyl cysteine synthetase (GCS)". The glutamate-cysteine ligase is known to catalyze the following reaction:

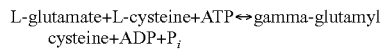

In addition, the reaction catalyzed by the glutamate-cysteine ligase is known as a first step of glutathione synthesis.

The glutamate-cysteine ligase, as a yeast-derived sequence, may be a protein including an amino acid sequence of SEQ ID NO: 1, without being limited thereto.

In the present disclosure, the amino acid sequence of SEQ ID NO: 1 is an amino acid sequence encoded by gsh1 gene and may also be referred to as "GSH1 protein" or "glutamate cysteine ligase". The amino acid sequence constituting the glutamate-cysteine ligase of the present disclosure may be obtained from a known database of the NCBI GenBank. For example, the amino acid sequence may be derived from *Saccharomyces cerevisiae*, but is not limited thereto, and may include any sequence having the same activity as the amino acid sequence without limitation.

In addition, although the glutamate cysteine ligase is defined as a protein including the amino acid sequence of SEQ ID NO: 1 in the present disclosure, it does not exclude a mutation that may occur naturally or by addition of a meaningless sequence upstream or downstream of the amino acid sequence of SEQ ID NO: 1 or a naturally occurring mutation or a silent mutation thereof, and it is obvious to those skilled in the art that any proteins having the activity identical or equivalent to the protein including the amino acid sequence of SEQ ID NO: 1 belong to the glutamate-cysteine ligase of the present disclosure.

For example, the glutamate-cysteine ligase of the present disclosure may be a protein including the amino acid sequence of SEQ ID NO: 1 or an amino acid sequence having at least 80%, 85%, 90%, 95%, 96%, 97%, 98%, or 99% homology or identity therewith. Also, it will be obvious that any protein having the amino acid sequence including a deletion, modification, substitution, or addition of one or several amino acids is within the scope of the present disclosure as long as the amino acid sequence retains the above-described homology or identity and an effect equivalent to that of the protein.

In other words, although the expressions "protein or polypeptide having an amino acid sequence of a predetermined SEQ ID NO:" and "protein or polypeptide including an amino acid sequence of a predetermined SEQ ID NO:" are used in the present disclosure, it is obvious that any protein having the amino acid sequence including a deletion, modification, substitution, or addition of one or several amino acids may also be used in the present disclosure, as long as the protein has an activity identical or equivalent to the polypeptide consisting of the predetermined amino acid sequence. For example, it is obvious that a "polypeptide including the amino acid sequence of SEQ ID NO: 1" belongs to a "polypeptide consisting of the amino acid sequence of SEQ ID NO: 1" as long as the former has the same or an equivalent activity to the latter.

As used herein, the term "variant" refers to a protein obtained by conservative substitution and/or modification of at least one amino acid different from that of the recited sequence while retaining functions or properties of proteins, and may be a variant of the glutamate-cysteine ligase in which the amino acid corresponding to the 86$^{th}$ position from the N-terminus of an amino acid sequence of SEQ ID NO: 1 is substituted with an amino acid residue other than cysteine in view of the objects of the present disclosure. The variant is different from the sequence identified by substitution, deletion, or addition of several amino acids. Such variants may generally be identified by modifying one of the above amino acid sequences of the protein and evaluating properties of the modified protein. That is, the ability of the variant may be enhanced relative to a native protein. In addition, some variants may include variants from which at least one portion such as a N-terminus leader sequence or a transmembrane domain have been removed. Other variants may include variants in which a portion has been removed from the N- and/or C-terminus of a mature protein. The term "variant" may also be used interchangeably with other terms such as modification, modified protein, modified polypeptide, mutant, mutein, and divergent, and any terms used to indicate variation may also be used without limitation. In view of the objects of the present disclosure, the variant may have enhanced activity compared to wild-type or non-modified proteins, without being limited thereto.

As used herein, the term "conservative substitution" refers to substitution of one amino acid with a different amino acid having similar structural and/or chemical properties. The variant may have at least one conservative substitution while retaining at least one biological activity. Such amino acid substitution may generally occur based on similarity of polarity, charge, solubility, hydrophobicity, hydrophilicity, and/or amphipathic nature of a residue.

Variants may also include deletion or addition of amino acids that have minimal influence on properties and a secondary structure of a polypeptide. For example, the polypeptide may be conjugated to a signal (or leader) sequence at the N-terminus of a protein which co-translationally or post-translationally directs transfer of the protein. The polypeptide may also be conjugated with another sequence or linker to identify, purify, or synthesize the polypeptide.

In the present disclosure, "substituted with a different amino acid" is not particularly limited as long as the amino acid after substitution is different from the amino acid before substitution. That is, substitution of cysteine that is the 86$^{th}$ amino acid from the N-terminus of the amino acid sequence of SEQ ID NO: 1 with a different amino acid may also be expressed as "substitution of the 86$^{th}$ amino acid with an amino acid other than cysteine". Meanwhile, in the present disclosure, it is obvious that the expression "substituted with a predetermined amino acid" means that the amino acid after substitution is different from the amino acid before substitution unless the expression "substituted with a different amino acid" is given.

The "glutamate-cysteine ligase variant" of the present disclosure may also be referred to as "a (variant) polypeptide having the glutamate-cysteine ligase activity" or "GSH1 variant" that may increase glutathione production compared to a protein before modification, a wild-type polypeptide, or a non-modified polypeptide, without being limited thereto.

In the variant, at least one amino acid of the amino acid sequence of SEQ ID NO: 1 may be substituted with a different amino acid. Specifically, the variant may include a substitution of the amino acid corresponding to the 86$^{th}$ position of the amino acid sequence of SEQ ID NO: 1 with an amino acid other than cysteine. The different amino acid may be selected from glycine, alanine, valine, leucine, isoleucine, methionine, phenylalanine, tryptophan, proline, serine, threonine, tyrosine, asparagine, glutamate, glutamine, aspartate, lysine, arginine, and histidine.

In the present disclosure, it is obvious that the "variant in which the 86$^{th}$ amino acid from the N-terminus of the amino acid sequence of SEQ ID NO: 1 is substituted with a different amino acid" includes a variant in which an amino acid corresponding to the 86$^{th}$ position of the amino acid sequence of SEQ ID NO: 1 is substituted with a different amino acid, although the amino acid is at a position other than the 86$^{th}$ position due to deletion/addition/addition or the like of an amino acid at the N- or C-terminus or in the middle of the amino acid sequence of SEQ ID NO: 1.

Also, although the variant, in which the 86$^{th}$ amino acid from the N-terminus of the amino acid sequence of SEQ ID NO: 1 is substituted with a different amino acid, is disclosed as an example of the glutamate cysteine ligase variant in the present disclosure, the glutamate-cysteine ligase of the present disclosure variant is not limited to the variant of the amino acid sequence of SEQ ID NO: 1, and it is obvious that a variant in which "the amino acid corresponding to the 86$^{th}$ position of the amino acid sequence of SEQ ID NO: 1" is substituted with a different amino acid in any amino acid sequence having the activity of the glutamate-cysteine ligase is also within the scope of the glutamate-cysteine ligase variant of the present disclosure.

In any amino acid sequence, the "amino acid corresponding to the 86$^{th}$ position of the amino acid sequence of SEQ ID NO: 1" may be identified by various sequence alignment methods well known in the art.

The glutamate-cysteine ligase variant of the present disclosure in which the amino acid corresponding to the 86$^{th}$ position from the N-terminus of an amino acid sequence of SEQ ID NO: 1 is substituted with a different amino acid may be a protein including the amino acid sequence of SEQ ID NO: 1 or an amino acid sequence having at least 80%, 85%, 90%, 95%, 96%, 97%, 98%, or 99% homology or identity therewith in which an amino acid corresponding to the 86$^{th}$ position of SEQ ID NO: 1 is substituted with a different amino acid.

The glutamate-cysteine ligase variant in which the 86$^{th}$ amino acid from the N-terminus of the amino acid sequence of SEQ ID NO: 1 is substituted with an amino acid other than cysteine according to the present disclosure may include one of the amino acid sequences of SEQ ID NOS: 3 to 21. Specifically, the variant may consist essentially of one of the amino acid sequences of SEQ ID NOS: 3 to 21, and more specifically, it may consist of one of the amino acid sequences of SEQ ID NOS: 3 to 21, but is not limited thereto.

Also, the variant may include one of the amino acid sequences of SEQ ID NOS: 3 to 21 or an amino acid sequence including the fixed 86$^{th}$ amino acid (i.e., in the amino acid sequence of the variant, the amino acid corresponding to the 86$^{th}$ position of the SEQ ID NO: 3 to 21 is identical to the amino acid at the 86$^{th}$ position of the SEQ ID NO: 3 to 21) and having at least 80% homology or identity therewith, but is not limited thereto.

Specifically, the variant of the present disclosure may include a polypeptide having one of the amino acid sequences of SEQ ID NOS: 3 to 21 and a polypeptide having at least 80%, 90%, 95%, 96%, 97%, 98%, or 99% homology or identity with one of the amino acid sequences of SEQ ID NOS: 3 to 21. Also, it is obvious that any protein having the amino acid sequence including a deletion, modification, substitution, or addition of one or several amino acids at a position other than the 86th position is within the scope of the present disclosure as long as the protein retains the above-described homology or identity and an effect equivalent to that of the variant.

As used herein, the term "homology" or "identity" refers to a degree of relevance between two given amino acid sequences or base sequences and may be expressed as a percentage. The terms homology and identity may often be used interchangeably.

Sequence homology or identity of conserved polynucleotides or polypeptides may be determined by way of a standard alignment algorithm, and default gap penalties established by a program may be used together therewith. Substantially, homologous or identical sequences may hybridize with each other for at least about 50%, 60%, 70%, 80%, or 90% of the entire sequence or the entire length under moderate or highly stringent conditions. In hybridized polynucleotides, polynucleotides including a degenerate codon instead of a codon may also be considered.

The sequence homology, similarity, or identity between two given polypeptides or polynucleotides may be determined using any known computer algorithm such as the "FASTA" program by using default parameters as introduced by, for example, Pearson et al. (1988) *Proc. Natl. Acad. Sci. USA* 85:2444. Alternatively, the Needleman-Wunsch algorithm (1970, *J. Mol. Biol.* 48:443-453) performed in the Needleman program of The European Molecular Biology Open Software Suite (EMBOSS) package (Rice et al., 2000, *Trends Genet.* 16:276-277) (version 5.0.0 or later) may be used to determine the same (including the GCG program package (Devereux, J. et al., *Nucleic Acids Research* 12:387 (1984)), BLASTP, BLASTN, FASTA (Atschul, S. F. et al., *J MOLEC BIOL* 215:403 (1990); *Guide to Huge Computers*, Martin J. Bishop, ed., Academic Press, San Diego, 1994; and CARILLO et al. (1988) *SIAM J Applied Math* 48:1073). For example, the homology, similarity, or identity may be determined using BLAST, from the National Center for Biotechnology Information database, or ClustalW.

The homology, similarity, or identity between polynucleotides or polypeptides may be determined by comparing sequence information using the GAP computer program, such as a program introduced by Needleman et al. (1970), *J Mol Biol.* 48:443 as disclosed in Smith and Waterman, *Adv. Appl. Math* (1981) 2:482. In brief, the GAP program defines similarity as the number of aligned symbols (i.e., nucleotides or amino acids) which are similar, divided by the total number of symbols in the shorter of two sequences. Default parameters for the GAP program may include: (1) a binary comparison matrix (containing a value of 1 for identity and 0 for non-identity) a weighted comparison matrix of Gribskov et al. (1986) *Nucl. Acids Res.* 14:6745 disclosed in Schwartz and Dayhoff, eds., *Atlas Of Protein Sequence And Structure*, National Biomedical Research Foundation, pp. 353-358 (1979) (or EDNAFULL (EMBOSS version of NCBI NUC4.4) substitution matrix); (2) a penalty of 3.0 for each gap and an additional 0.10 penalty for each symbol in each gap (or gap open penalty of 10, and a gap extension penalty of 0.5); and (3) no penalty for end gaps.

Also, the sequence homology, similarity, or identity between two given polynucleotides or polypeptides may be identified by comparing sequences thereof by Southern hybridization under defined stringent conditions, and the defined stringent hybridization conditions are within the scope of the technology and may be defined by a method well known to one of ordinary skill in the art (For example, J. Sambrook et al., Molecular Cloning, A Laboratory Manual, 2nd Edition, Cold Spring Harbor Laboratory press, Cold Spring Harbor, New York, 1989; F. M. Ausubel et al., *Current Protocols in Molecular Biology*, John Wiley & Sons, Inc., New York).

Another aspect of the present disclosure provides a polynucleotide encoding the variant.

As used herein, the term "polynucleotide" refers to a polymer of nucleotides in which nucleotide monomers are linked to each other in a long chain shape by covalent bonds and generally means a DNA or RNA strand having a certain minimum length, more specifically a polynucleotide fragment encoding the variant.

The polynucleotide encoding the variant of the protein according to the present disclosure may include any nucleotide sequence encoding the glutamate-cysteine ligase variant having enhanced activity without limitation.

A gene encoding the glutamate-cysteine ligase of the present disclosure may be gsh1 gene. The gene may be derived from yeast. Specifically, the gene may be derived from a microorganism belonging to the genus *Saccharomyces*, more specifically *Saccharomyces cerevisiae*. Specifically, the gene may be a gene encoding the amino acid sequence of SEQ ID NO: 1, more specifically a sequence including a base sequence of SEQ ID NO: 2, but is not limited thereto.

The polynucleotide of the present disclosure may include various modifications made in a coding region provided not to change the amino acid sequence of the polypeptide expressed from the coding region by codon degeneracy or in consideration of codons preferred by a living organism in which the polypeptide is expressed. Specifically, any polynucleotide sequence encoding a protein variant in which the amino acids at a position corresponding to the 86$^{th}$ position of SEQ ID NO: 1 is substituted with a different amino acid may be included therein without limitation. For example, the polynucleotide of the present disclosure may have a polynucleotide sequence encoding the protein variant of the present disclosure, specifically a protein including one of the amino acid sequences of SEQ ID NOS: 3 to 21 or a polypeptide having homology or identity therewith, without being limited thereto. The homology or identity is as described above.

In addition, the polynucleotide may include a nucleotide sequence that is hybridized with a probe constructed using a known gene sequence, e.g., a nucleotide sequence entirely or partly complementary to the nucleotide sequence under stringent conditions to encode the protein variant, in which the amino acid corresponding to the 86$^{th}$ position of the amino acid sequence of SEQ ID NO: 1 is substituted with a different amino acid, without limitation.

The term "stringent conditions" refers to conditions which permit specific hybridization between polynucleotides. Such conditions are disclosed in detail in known documents (e.g., J. Sambrook et al.). For example, the conditions may include performing hybridization between genes having a high homology, e.g., a homology of 80% or more, specifically 90% or more, more specifically 95% or more, even more specifically 97% or more, and most specifically 99% or more, without performing hybridization between genes having a homology lower than the above homologies, or performing hybridization once, specifically two or three times, under conventional washing conditions for Southern hybridization at a salt concentration and temperature of 60° C., 1×SSC, and 0.1% SDS, specifically 60° C., 0.1×SSC, 0.1% SDS, and more specifically 68° C., 0.1×SSC, and 0.1% SDS. However, the stringent conditions are not limited thereto and may be appropriately adjusted by those skilled in the art according to the intended purposes.

Hybridization requires that two polynucleotides have complementary sequences, although mismatch of bases is possible according to the degree of stringency of hybridization. The term "complementary" is used to describe the relationship between nucleotide bases capable of hybridizing with each other. For example, with respect to DNA, adenosine is complementary to thymine, and cytosine is complementary to guanine. Thus, the present disclosure may include not only a substantially similar nucleic acid sequence but also an isolated nucleic acid fragment complementary to the entire sequence.

Specifically, the polynucleotides having homology or identity may be detected using the above-described hybridization conditions including a hybridization process at a $T_m$ value of 55° C. Also, the $T_m$ value may be, but is not limited to, 60° C., 63° C. or 65° C., and may be appropriately adjusted by those skilled in the art according to the intended purposes.

An appropriate degree of stringency for hybridization of polynucleotides may depend on lengths of the polynucleotides, and a degree of complementarity and parameters thereof are well known in the art.

Another aspect of the present disclosure provides a vector including a polynucleotide encoding the protein variant.

As used herein, the term "vector" refers to a DNA construct including a base sequence of a polynucleotide encoding a target protein, which is operably linked to an appropriate regulatory sequence to express the target protein in a suitable host cell. The regulatory sequence may include a promoter allowing initiating transcription, an operator sequence for regulating the transcription, a sequence encoding a suitable mRNA ribosome binding site, and a sequence regulating termination of transcription and translation. After the vector is introduced into the suitable host cell, it may replicate or function independently of the host genome and may be integrated into the genome itself.

The vector used in the present disclosure is not particularly limited, and any vector known in the art may be used. As a vector expressed by yeast, both integrative yeast plasmids (Yip) and extrachromosomal plasmid vectors may be used. The extrachromosomal plasmid vector may include episomal yeast plasmids (YEp), replicative yeast plasmids (YRp), and yeast centromer plasmids (YCp). Also, artificial yeast chromosomes (YACs) may also be used as the vector of the present disclosure. As a specific example, available vectors may include pESCHIS, pESC-LEU, pESC-TRP, pESC-URA, Gateway pYES-DEST52, pAO815, pGAPZ A, pGAPZ B, pGAPZ C, pGAPα A, pGAPα B, pGAPα C, pPIC3.5K, pPIC6 A, pPIC6 B, pPIC6 C, pPIC6α A, pPIC6α B, pPIC6α C, pPIC9K, pYC2/CT, pYD1 Yeast Display Vector, pYES2, pYES2/CT, pYES2/NT A, pYES2/NT B, pYES2/NT C, pYES2/CT, pYES2.1, pYES-DEST52, pTEF1/Zeo, pFLD1, PichiaPink™, p427-TEF, p417-CYC, pGAL-MF, p427-TEF, p417-CYC, PTEF-MF, pBY011, pSGP47, pSGP46, pSGP36, pSGP40, ZM552, pAG303GAL-ccdB, pAG414GAL-ccdB, pAS404, pBridge, pGAD-GH, pGAD T7, pGBK T7, pHIS-2, pOBD2, pRS408, pRS410, pRS418, pRS420, pRS428, yeast micron A form, pRS403, pRS404, pRS405, pRS406, pYJ403, pYJ404, pYJ405, and pYJ406, without being limited thereto.

For example, a polynucleotide encoding a target protein in the chromosome may be replaced by a mutated polynucleotide using a vector for chromosomal insertion into cells. The insertion of the polynucleotide into the chromosome may be performed by any method known in the art, for example, homologous recombination, without being limited thereto. A selection marker may be further included to confirm chromosomal insertion. The selection marker is used to select cells that are transformed with the vector, that is, to confirm insertion of a desired polynucleotide, and examples of the selection marker may include markers providing selectable phenotypes, such as drug resistance, nutrient requirement, resistance to cytotoxic agents, or surface expression of variant polypeptide. Only cells expressing the selection marker are able to survive or to show different phenotypes under the environment treated with a selective agent, and thus the transformed cells may be selected.

As used herein, the term "transformation" refers to a process of introducing the vector including the polynucleotide encoding the glutamate cysteine ligase variant into a host cell in such a way that the protein encoded by the polynucleotide is expressed in the host cell. The transformed polynucleotide may be either in a form inserted into the chromosome of the host cell or in a form located outside the chromosome as long as the protein is expressed in the host cell. In addition, the polynucleotide includes DNA and RNA encoding the glutamate-cysteine ligase variant. The polynucleotide may be introduced into the host cell in any form as long as the polynucleotide is introduced into the host cell and the protein is expressed therein. For example, the polynucleotide may be introduced into the host cell in the form of an expression cassette that is a gene construct including all of the essential elements required for self-replication. The expression cassette may generally include a promoter operably linked to the polynucleotide, a transcription termination signal, a ribosome binding site, and a translation termination signal. The expression cassette may be in the form of a self-replicable expression vector. Also, the polynucleotide may be introduced into the host cell in its original form and operably linked to a sequence required for the expression in the host cell, without being limited thereto.

In addition, as used herein, the term "operably linked" means a functional linkage between a polynucleotide sequence encoding the polypeptide of the present disclosure and a promoter sequence which initiates and mediates transcription of the polynucleotide sequence. Methods for the transformation according to the present disclosure include any methods enabling introduction of the vector into the host cell, and may be performed by suitable standard techniques well known in the art selected according to the host cell. For example, electroporation, calcium phosphate ($CaPO_4$) precipitation, calcium chloride ($CaCl_2$)) precipitation, microinjection, a polyethylene glycol (PEG) method, a DEAE-dextran method, a cationic liposome method, and a lithium acetate-DMSO method may be used, but the present disclosure is not limited thereto.

The present disclosure may provide a microorganism producing glutathione by including at least one of: the variant; a polynucleotide encoding the variant; and a vector including the polynucleotide.

The microorganism may be a microorganism expressing the variant or a microorganism into which the variant is introduced.

As used herein, the term "microorganism including the variant", "microorganism into which the variant is introduced", or "microorganism expressing the variant" may refer to a microorganism prepared by enhancing the ability to produce glutathione to a microorganism naturally having a low ability to produce glutathione or by providing the ability to produce glutathione to a parent strain unable to produce glutathione. Specifically, the microorganism may be a microorganism expressing the glutamate-cysteine ligase variant including at least one amino acid mutation in the amino acid sequence of SEQ ID NO: 1, and the amino acid mutation may include a substitution of the amino acid corresponding to the $86^{th}$ position from the N-terminus with a different amino acid. In addition, the microorganism may be a microorganism expressing the glutamate-cysteine ligase variant in which the amino acid corresponding to the 86th position of the amino acid sequence of SEQ ID NO: 1 is substituted with a different amino acid, without being limited thereto.

The glutamate-cysteine ligase and variants thereof are as described above.

As used herein, a protein "to be expressed/being expressed" means a state in which a target protein is introduced into or expressed in a microorganism. In the case where the protein is present in the microorganism, the activity of the protein is enhanced compared to the activity of an endogenous protein thereof or that before modification. In view of the objects of the present disclosure, the "target protein" may be the above-described glutamate-cysteine ligase variant.

Specifically, the term "introduction of a protein" refers to providing activity of a particular protein to a microorganism which does not possess the protein or enhancing the activity of the protein compared to the intrinsic activity of the protein or the activity before modification. For example, the introduction of a protein may refer to introduction of a polynucleotide encoding a particular protein into a chromosome or introduction of a fragment or vector including the polynucleotide encoding the particular protein into a microorganism, thereby expressing the activity of the protein. In addition, the "enhancement of activity" may mean that the activity of a particular protein of a microorganism is enhanced when compared with the intrinsic activity or the activity before modification. The term "intrinsic activity" refers to activity of a particular protein possessed by a parent strain before transformation when a microorganism is transformed by natural or artificial genetic variation.

Specifically, enhancement of the activity according to the present disclosure may be performed by at least one of the methods including increasing the copy number of a gene encoding the protein variant, introducing mutation into an expression regulatory sequence of the gene encoding the protein variant, replacing the expression regulatory sequence of the gene encoding the protein variant with a sequence having stronger activity, replacing a chromosomal gene encoding a wild-type protein with a gene encoding the protein variant, additionally introducing mutation into the gene encoding the protein variant in order to enhance the activity of the protein variant, and introducing the protein variant into a microorganism, without being limited thereto.

Although not particularly limited thereto, the increase in the copy number of the gene is performed in a form operably linked to a vector or in a form integrated into a chromosome of a host cell. Specifically, this method may be performed by introducing into a host cell a vector which replicates and functions irrespective of a host and is operably linked to a polynucleotide encoding the protein of the present disclosure. Alternatively, the copy number of the gene may be increased by introducing into a host cell a vector which inserts the polynucleotide into the chromosome of the host cell and is operably linked to the polynucleotide. The insertion of the polynucleotide into the chromosome may be performed by any method well known in the art, for example, homologous recombination.

Next, the modification of the expression regulatory sequence to increase the expression of the polynucleotide may be performed by inducing a variation in the nucleotide acid sequence by deletion, insertion, non-conservative substitution, conservative substitution, or any combination thereof to further enhance the activity of the expression regulatory sequence, or by replacing the nucleotide sequence with a nucleotide sequence having a stronger activity, without being limited thereto. The expression regulatory sequence may include a promoter, an operator sequence, a ribosome binding site encoding sequence, and a sequence for regulating transcription and translation, without being limited thereto.

A stronger promoter than the intrinsic promoter may be linked upstream of the polynucleotide expression unit, without being limited thereto. For example, when the host cell is yeast, the available promotor may include a TEF1 promoter, a TEF2 promoter, a GAL10 promoter, a GAL1 promoter, an ADH1 promoter, an ADH2 promoter, a PHO5 promoter, a GAL1-10 promoter, a TDH3 promoter (GPD promoter), a TDH2 promoter, a TDH1 promoter, a PGK1 promoter, a PYK2 promoter, an ENO1 promoter, an ENO2 promoter, and a TPI1 promoter, without being limited thereto. In addition, the modification of the polynucleotide sequence on the chromosome described may be performed by inducing a variation in the expression regulatory sequence by deletion, insertion, non-conservative substitution, conservative substitution, or any combination thereof to further enhance the activity of the polynucleotide sequence, or by replacing the nucleotide sequence with a nucleotide sequence modified to have a stronger activity, without being limited thereto.

Generally, the introduction and enhancement of the protein activity may increase the activity or concentration of the corresponding protein by 1%, 10%, 25%, 50%, 75%, 100%, 150%, 200%, 300%, 400%, or 500%, to a maximum of 1000% or 2000%, from the activity or concentration of a wild-type or non-modified microorganism strain, without being limited thereto.

As used herein, the term "non-modified microorganism" does not exclude strains having mutation that may occur naturally in microorganisms and may be a wild-type strain, a microorganism not including the protein variant, or a microorganism not transformed with a vector including a polynucleotide encoding the protein variant.

In the present disclosure, the microorganism including the glutamate-cysteine ligase variant or the polynucleotide encoding the same may be, for example, a recombinant microorganism prepared by transforming the microorganism with the vector including the polynucleotide, but is not limited thereto. The recombinant microorganism may be yeast, for example, a microorganism belonging to the genus *Saccharomyces*, specifically *Saccharomyces cerevisiae*. For example, the microorganism may be a *Saccharomyces cerevisiae* strain with Accession No. KCCM12659P, but is not limited thereto.

As used herein, the term "glutathione" may be interchangeably used with "GSH" and refers to a tripeptide compound consisting of three amino acids: glutamate, cysteine, and glycine. Glutathione may be used as a raw material for pharmaceuticals, health functional foods, taste ingredients, food and feed additives, cosmetics, and the like, but is not limited thereto.

As used herein, the term "glutathione-producing microorganism" includes microorganisms modified by natural or artificial genetic modification and may refer to a microorganism having a particular mechanism weakened or enhanced via introduction of an exogenous gene or enhancement or inactivation of an endogenous gene by genetic modification in order to produce glutathione. In view of the objects of the present disclosure, the microorganism producing glutathione may refer to a microorganism including the glutamate-cysteine ligase and capable of producing a large amount of target glutathione compared to wild-type or non-modified microorganisms. The "glutathione-producing microorganism" may be used interchangeably with "microorganism producing glutathione", "microorganism having the ability to produce glutathione", "glutathione-producing strain", "strain having the ability to produce glutathione", or the like.

The glutathione-producing microorganism may be a recombinant microorganism. The recombinant microorganism is as described above.

The type of the glutathione-producing microorganism is not particularly limited as long as glutathione is produced thereby, but may be a microorganism belonging to the genus *Saccharomyces*, specifically *Saccharomyces cerevisiae*, without being limited thereto.

A parent strain of the glutathione-producing microorganism including the variant is not particularly limited as long as the strain has the ability to produce glutathione. The microorganism may include modification for enhancement of a biosynthetic pathway for increasing glutathione producing ability, release of feedback inhibition, and inactivation of genes that weaken the degradation pathway or biosynthetic pathway, and such modification does not exclude naturally occurring modification. However, the present disclosure is not limited thereto.

Another aspect of the present disclosure provides a method of producing glutathione including culturing the microorganism. The microorganism and glutathione are as described above. Glutathione may be accumulated in the strain by culturing the strains.

With regard to a culture medium or other culturing conditions for culturing the strain of the present disclosure, any culture media commonly used to culture microorganisms belonging to the genus *Saccharomyces* may be used without limitation. Specifically, the strain of the present disclosure may be cultured in an ordinary medium containing appropriate carbon sources, nitrogen sources, phosphorus sources, inorganic compounds, amino acids, and/or vitamins under aerobic or anaerobic conditions while adjusting temperature, pH, and the like.

In the present disclosure, as the carbon sources, carbohydrates such as glucose, fructose, sucrose, and maltose; sugar alcohols such as mannitol and sorbitol; organic acids such as pyruvic acid, lactic acid, and citric acid; and amino acids such as glutamate, methionine, and lysine may be used, without being limited thereto. In addition, natural organic nutrients such as starch hydrolysates, molasses, blackstrap molasses, rice bran, cassava, sugar cane bagasse, and corn steep liquor may be used, and carbohydrates such as glucose and sterile pretreated molasses (i.e., molasses converted to reduced sugars) may be used, and suitable amounts of any other carbon sources may also be used without limitation. These carbon sources may be used alone or in a combination of at least two thereof.

As the nitrogen sources, inorganic nitrogen sources such as ammonia, ammonium sulfate, ammonium chloride, ammonium acetate, ammonium phosphate, ammonium carbonate, and ammonium nitrate; and organic nitrogen sources such as amino acids, peptone, NZ-amine, meat extract, yeast extract, malt extract, corn steep liquor, casein hydrolysate, fish or degradation products thereof, and defatted soybean cake or degradation products thereof may be used. These nitrogen sources may be used alone or in a combination of at least two thereof.

As the phosphorus sources, monopotassium phosphate, dipotassium phosphate, or sodium-containing salts corresponding thereto may be used. As the inorganic compounds, sodium chloride, calcium chloride, iron chloride, magnesium sulfate, iron sulfate, manganese sulfate, calcium carbonate, and the like may be used.

The culture medium may further include amino acids, vitamins, and/or suitable precursors. Specifically, L-amino acids or the like may be added to the culture medium for the strain. Specifically, glycine, glutamate, and/or cysteine may be added to the culture medium, and L-amino acids such as lysine may further be added thereto, if required, but the present disclosure is not limited thereto.

The culture medium and precursors may be added to cultures in a batch or continuous process, without being limited thereto.

In the present disclosure, during the culturing process of the strain, compounds such as ammonium hydroxide, potassium hydroxide, ammonia, phosphoric acid, and sulfuric acid may be properly added to the cultures in order to adjust the pH of the cultures. Also, a defoaming agent such as fatty acid polyglycol ester may be added in order to inhibit formation of foams during culturing. In addition, oxygen or an oxygen-containing gas may be injected into the cultures to maintain the cultures in an aerobic condition, and nitrogen, hydrogen, or carbon dioxide gases may be injected into the cultures to maintain the culture in anaerobic and microaerobic conditions without injecting any other gases therefor.

The temperature of the cultures may be maintained at 25° C. to 40° C., more specifically at 28° C. to 37° C., without being limited thereto. The culturing may be continued until a desired amount of a desired substance is obtained, specifically for 1 hour to 100 hours, without being limited thereto.

The method of producing glutathione may further include an additional process after the culturing step. The additional process may appropriately be selected in accordance with the purpose of use of glutathione.

Specifically, the method of producing glutathione may include recovering glutathione from at least one selected from the strain, a dried product, an extract, a culture product, and a lysate thereof after the culturing of the microorganism.

The method may further include lysing the strain before or simultaneously with the recovering step. The lysing of the strain may be performed by any method commonly used in the art to which the present disclosure pertains, e.g., by heat treatment or by using a buffer solution for lysis, a sonicator, and a French press. Also, the lysing step may include an enzymatic reaction by a cell wall lytic enzyme, nuclease, transnucleotidase, protease, or the like, without being limited thereto.

In view of the objects of the present disclosure, dry yeast, yeast extract, yeast extract mix powder, and pure glutathione, each having a high glutathione content, may be prepared by way of the method of producing glutathione. However, the present disclosure is not limited thereto, and these products may be appropriately prepared according to desired products.

In the present disclosure, the dry yeast may be used interchangeably with "dried product of the strain". The dry yeast may be prepared by drying the yeast strain in which glutathione is accumulated, and specifically, it may be included in a feed composition, a food composition, and the like, without being limited thereto.

In the present disclosure, the yeast extract may be used interchangeably with terms such as "extract of the strain". The extract of the strain may refer to substances remaining after separating cell walls from the strains. Specifically, the extract of the strain may refer to remaining components, excluding cell walls, among components obtained by lysing the cells. The extract of the strain includes glutathione and one or more other components selected from proteins, carbohydrates, nucleic acids, and fibers in addition to glutathione, without being limited thereto.

The recovering step may be performed using any suitable method well known in the art, and glutathione, as the target substance, may be recovered.

The recovering step may include a purification process. The purification process may be performed by isolating only glutathione from the strain. Via the purification process, pure glutathione may be prepared.

If required, the method of preparing glutathione may further include mixing an excipient with one selected from the strain, a dried product, an extract, a culture, and a lysate thereof, and glutathione recovered therefrom. By way of the mixing step, a yeast extract mix powder may be prepared.

The excipient may be appropriately selected and used according to the intended use or form and may be, for example, selected from starch, glucose, cellulose, lactose, glycogen, D-mannitol, sorbitol, lactitol, maltodextrin, calcium carbonate, synthetic aluminum silicate, calcium monohydrogen phosphate, calcium sulfate, sodium chloride, sodium hydrogen carbonate, purified lanolin, dextrin, sodium alginate, methyl cellulose, colloidal silica gel, hydroxypropyl starch, hydroxypropylmethyl cellulose, propylene glycol, casein, calcium lactate, primojel, and Arabia gum, and specifically, it may include at least one component selected from starch, glucose, cellulose, lactose, dextrin, glycogen, D-mannitol, and maltodextrin, without being limited thereto.

The excipient may include, for example, a preservative, a humectant, a dispersant, a suspending agent, a buffer, a stabilizer, or an isotonic agent, without being limited thereto.

Another aspect of the present disclosure provides a use of the glutamate-cysteine ligase variant for producing glutathione. Another aspect of the present disclosure provides a use of the microorganism for producing glutathione. The glutamate-cysteine ligase variant, the microorganism, and glutathione are as described above.

MODE FOR INVENTION

Hereinafter, the present disclosure will be described in more detail with reference to the following examples and experimental examples. However, the following examples and experimental examples are merely presented to exemplify the present invention, and the scope of the present invention is not limited thereto.

Example 1: Selection of Glutathione-Producing Strain and Confirmation of Glutathione Producing Ability Strains were obtained from yeast blocks containing various strains, and characteristics thereof were improved to select strains having a glutathione producing ability.

Specifically, grain samples such as rice, barley, mung beans, and oats were collected from 20 areas, such as, Hwaseong, Pyeongtaek, Yongin, and the like of Gyeonggi-do, Republic of Korea, pulverized, kneaded, wrapped in a cloth, pressed firmly to form a shape, wrapped with straw for fermentation for 10 days, and slowly dried to prepare yeast blocks.

The following experiment was performed to isolate various strains from the prepared yeast blocks. 45 mL of a saline solution was added to 5 g of yeast blocks and pulverized using a mixer. For purely isolating yeast strains, the resultant was diluted by serial dilution, spread on YPD agar (10 g/L yeast extract, 20 g/L bacto peptone, and 20 g/L glucose per 1 L of distilled water), and cultured at 30° C. for 48 hours. Then, according to the morphology of colonies and microscopic verification, colonies of the yeast were streaked on the YPD agar. 25 ml of YPD broth was seeded in a 250 ml conical flask, and the purely isolated strain was inoculated thereonto and cultured in a shaking incubator for 48 hours at 30° C. and 200 rpm. Strains were screened by identifying glutathione production.

In order to improve primarily isolated strains, random mutation was induced in the isolated strains. Specifically, a strain confirmed to have the glutathione producing ability was isolated from the yeast blocks and designated as CJ-37 strain. The CJ-37 strain was cultured in a solid medium and inoculated into a broth to obtain a culture solution thereof, and the culture solution was exposed to UV light using a UV lamp. After the culture solution exposed to UV rays was plated on a plate medium, only a mutated strain that had formed colonies was isolated, and glutathione production thereof was identified.

As a result, among the mutated strains, a strain exhibiting the greatest glutathione production was selected as a glutathione-producing strain, named CJ-5 strain, deposited at the Korean Culture Center of Microorganisms (KCCM) under the Budapest Treaty, and designated as Accession No. KCCM12568P on Jul. 31, 2019.

Example 2: Experiment for Further Improving Glutathione Producing Ability

Mutation was induced in the following manner in order to further improve the glutathione producing ability of the CJ-5 strain.

The CJ-5 strain was cultured in a solid medium and inoculated into a broth to obtain a culture solution, and the culture solution was exposed to UV light using a UV lamp. After the culture solution exposed to UV light was plated on a plate medium, only a mutated strain that had formed colonies was isolated. A strain exhibiting the greatest glutathione production was isolated, named CC02-2490 strain, deposited at the Korean Culture Center of Microorganisms (KCCM) under the Budapest Treaty, and designated as Accession No. KCCM12659P on Jan. 17, 2020. As a result of analyzing the base sequence of the gsh1, which is a glutathione biosynthesis gene, with respect to enhancement of the glutathione producing ability of the strain, it was confirmed that cysteine, which is the $86^{th}$ amino acid of the GSH1 protein encoded by the gsh1 gene, had been substituted with arginine.

Example 3: Experiment for Mutation of GSH1 C86 Residue

Considering that the amino acid at the $86^{th}$ position of the of the GSH1 protein is important in glutathione production based on the results of Example 2, mutant strains of *Saccharomyces cerevisiae* (*S. cerevisiae*) CEN.PK2-1D and *Saccharomyces cerevisiae* (*S. cerevisiae*) CJ-5 were prepared such that protein variants were expressed in which cysteine at the $86^{th}$ position of the GSH1 protein was substituted with a different amino acid, and increases in glutathione production were identified.

In order to prepare strains in which cysteine at the $86^{th}$ position of the GSH1 protein of *Saccharomyces cerevisiae* was substituted with arginine, pWAL100 and pWBR100 plasmids were used with reference to a thesis of Lee T H et al. (J. Microbiol. Biotechnol. (2006), 16 (6), 979-982). Specifically, polymerase chain reaction (PCR) was performed using genomic DNA of the CJ-5 strain as a template as follows. A partial sequence of the N-terminus of the GSH1 protein including a N-terminal BamHI flanking sequence, a GSH1 ORF initiation codon, and a C86R mutation-encoding sequence was obtained by performing PCR using primers of SEQ ID NOS: 22 and 23, and a partial sequence of the C-terminus of the GSH1 protein including a C-terminal XhoI flanking sequence, a GSH1 ORF termination codon, and a C86R mutation-encoding sequence was obtained by performing PCR using primers of SEQ ID NOS: 24 and 25. Subsequently, as a result of performing overlap PCR using the two sequences as templates with the primers of SEQ ID NOS: 22 and 25, a GSH1 ORF fragment, including a sequence encoding a GSH1-modified protein was obtained in which cysteine at the $86^{th}$ position was substituted with arginine and N-terminal BamHI and C-terminal XhoI restriction enzyme sequences. The ORF fragment was treated with BamHI and XhoI and then cloned into a pWAL100 vector treated with the same enzymes to prepare a pWAL100-GSH1 (C86R) vector.

Also, the 500 bp downstream from the GSH1 ORF termination codon including N-terminal SpeI and C-terminal NcoI restriction enzyme sequences was obtained by performing PCR using the genomic DNA of the CJ-5 strain as a template and primers of SEQ ID NOS: 26 and 27 and treated with SpeI and NcoI restriction enzymes. Subsequently, the resultant was cloned into pWBR100 treated with the same enzymes to prepare a pWBR100-GSH1 vector.

For preparing a final DNA fragment to be introduced into the yeast, PCR products including the sequence encoding arginine mutation and a part of KlURA3 were obtained using the pWAL100-GSH1 (C86R) vector prepared as described above as a template and the primers of SEQ ID NOS: 22 and 28, and PCR products including a part of KlURA3 and the 500 bp downstream from the GSH1 termination codon were obtained using the pWBR100-GSH1 vector as a template and the primers of SEQ ID NOS: 29 and 27. *S. cerevisiae* CEN.PK2-1D and *S. cerevisiae* CJ-5 were transformed with the PCR products in the same molar ratio. PCR was performed via denaturation at 95° C. for 5 minutes, annealing at 53° C. for 1 minute, and polymerization for 1 minute per kb at 72° C., and the transformation of the yeast was carried out according to a lithium acetate method modified from a method disclosed in a thesis of Geitz (*Nucleic Acid Research*, 20 (6), 1425). Specifically, yeast cells with an OD of 0.7 to 1.2 were washed with a lithium acetate/TE buffer twice and mixed with the PCR products and single-stranded DNA (Sigma D-7656). The cells were cultured under a static culture condition in a lithium acetate/TE/40% PEG buffer at 30° C. for 30 minutes and at 42° C. for 15 minutes. Then, the cells cultured in a SC (2% glucose) agar plate not including uracil until colonies were visible to obtain a strain into which the GSH1 C86R mutation-encoding sequence and the KlURA3 gene were introduced. Subsequently, in order to remove KlURA3, the strains were cultured in 2 mL of YPD overnight, diluted at a ratio of 1/100, plated on an SC (2% glucose) agar plate including 0.1% 5-FOA to prepare *S. cerevisiae* CEN.PK2-1D GSH1 C86R mutated strain and *S. cerevisiae* CJ-5 GSH1 C86R mutated strain from which a uracil marker had been removed. Strains capable of expressing GSH1-modified proteins in which cysteine was substituted with 18 types of amino acids other than arginine were also prepared in the same manner, except that a primer pair of SEQ ID NOS: 23 and 24 was used in which the sequence encoding the 86$^{th}$ arginine was substituted with a sequence encoding a different amino acid.

TABLE 1

| Primer | 5'→3' sequence |
| --- | --- |
| F_BamHI_GSH1 (SEQ ID NO: 22) | GGTAGGATCCATGGGACTCTTAGCTTTGGGCAC |
| R_GSH1_C86R (SEQ ID NO: 23) | TTAGCCTCCCTAAGGGACGAATCCT |
| F_GSH1_C86R (SEQ ID NO: 24) | CGTCCCTTAGGGAGGCTAACGATGT |
| R_XhoI_GSH1 (SEQ ID NO: 25) | ATGACTCGAGTTAACATTTGCTTTCTATTGAAGGC |
| F_SpeI_GSH1_DW (SEQ ID NO: 26) | TAGAACTAGTACTCCTTTTATTTCGGTTGTGAA |
| R_NcoI_GSH1_DW (SEQ ID NO: 27) | GCTGCCATGGGAATAGTGTGAACCGATAACTGTGT |
| R_AL killer (SEQ ID NO: 28) | GAGCAATGAACCCAATAACGAAATCTT |
| F_BR killer (SEQ ID NO: 29) | CTTGACGTTCGTTCGACTGATGAG |

After culturing the strains prepared as described above for 26 hours, concentrations of produced glutathione (GSH) were measured and listed in Tables 2 and 3.

TABLE 2

| | S. cerevisiae CEN.PK2-1D | |
| --- | --- | --- |
| Mutant | GSH concentration (mg/L) 26 hr | Increase(fold) |
| WT | 86.0 | 1.00 |
| F | 109.5 | 1.27 |
| H | 103.2 | 1.20 |
| K | 100.7 | 1.17 |
| E | 100.1 | 1.16 |
| G | 99.5 | 1.16 |
| D | 97.5 | 1.13 |
| N | 96.3 | 1.12 |
| R | 95.2 | 1.11 |
| Y | 94.6 | 1.10 |
| I | 93.0 | 1.08 |
| L | 92.2 | 1.07 |
| P | 92.0 | 1.07 |
| W | 90.8 | 1.06 |
| Q | 90.3 | 1.05 |
| S | 90.0 | 1.05 |
| M | 89.9 | 1.05 |
| T | 86.6 | 1.01 |
| A | 86.4 | 1.00 |
| V | 86.2 | 1.00 |

TABLE 3

| | S. cerevisiae CJ-5 | |
| --- | --- | --- |
| Mutant | GSH concentration (mg/L) 26 hr | Increase(fold) |
| WT | 271.3 | 1.00 |
| R | 330.0 | 1.22 |
| N | 321.9 | 1.19 |
| D | 318.4 | 1.17 |
| E | 314.4 | 1.16 |
| P | 304.2 | 1.12 |
| K | 302.4 | 1.11 |
| A | 294.9 | 1.09 |
| Q | 286.4 | 1.06 |
| V | 285.6 | 1.05 |
| F | 282.5 | 1.04 |
| Y | 277.5 | 1.02 |
| W | 276.0 | 1.02 |
| S | 274.5 | 1.01 |
| T | 273.9 | 1.01 |
| I | 273.5 | 1.01 |
| H | 272.1 | 1.00 |
| G | 272.0 | 1.00 |

Based on the results of the experiment, it was confirmed that the glutathione producing ability obtained by substituting cysteine at the 86$^{th}$ position of the GSH1 protein with a different amino acid increased up to 27% compared to the glutathione producing ability obtained by the wild-type GSH1 protein.

Based thereon, it was confirmed that the GSH1 variant prepared by substituting cysteine at the 86$^{th}$ position of the GSH1 protein with a different amino acid had significantly improved glutathione producing ability.

Example 4: Confirmation of Effect of Another Cys Residue on Glutathione Production As a comparative example, another Cys residue of the GSH1 protein was modified, and the glutathione producing ability obtained by the modification was identified. The results are shown in Table 4 below.

TABLE 4

| | S. cerevisiae CJ-5 | |
| --- | --- | --- |
| Mutant | GSH concentration (mg/L) 26 hr | Increase(fold) |
| WT | 267.7 | 1.00 |
| C70A | 255.7 | 0.96 |
| C164A | 208.2 | 0.78 |
| C213A | 228.2 | 0.85 |
| C264A | 238.9 | 0.89 |
| C266A | 174.2 | 0.65 |
| C571A | 234.5 | 0.88 |
| C642A | 254.6 | 0.95 |
| C678A | 250.4 | 0.94 |

Referring to the results of the experiment, a cysteine residue other than the cysteine at the 86$^{th}$ position had no effects on increasing glutathione production, but instead decreased the glutathione production.

Based thereon, it was confirmed that not all cysteine residues present in the protein have effects on increasing glutathione production. Also, it was confirmed that the novel GSH1 variant developed in the present disclosure increased glutathione production.

Since the yeast producing glutathione with a high yield, a dried product, an extract, a culture, and a lysate thereof, and the produced glutathione have antioxidant, detoxification, and immunity-enhancing effects, they may be efficiently used to prepare the cosmetic composition, the food composition, the feed composition, and the pharmaceutical composition.

The above description of the present invention is provided for the purpose of illustration, and it would be understood by those skilled in the art that various changes and modifications may be made without changing the technical conception and essential features of the present invention. Thus, it is clear that the above-described embodiments are illustrative in all aspects and do not limit the present invention. The various embodiments disclosed herein are not intended to be limiting, with the true scope and spirit being indicated by the following claims. The present invention is to be limited only by the terms of the appended claims, along with the full scope of equivalents to which such claims are entitled.

The invention claimed is:

1. A glutamate-cysteine ligase variant in which an amino acid corresponding to the 86$^{th}$ position from the N-terminus of the amino acid sequence of SEQ ID NO: 1 is substituted with a different amino acid, wherein the variant comprises a sequence having identity equal to or greater than 90% and less than 100% with the amino acid sequence of SEQ ID NO: 1.

2. The glutamate-cysteine ligase variant of claim 1, wherein the amino acid corresponding to the 86$^{th}$ position is substituted with glycine, alanine, valine, leucine, isoleucine, methionine, phenylalanine, tryptophan, proline, serine, threonine, tyrosine, asparagine, glutamate, glutamine, aspartate, lysine, arginine, or histidine.

3. The glutamate-cysteine ligase variant of claim 1, wherein the variant consists of one amino acid sequence selected from SEQ ID NOS: 3 to 21.

4. A polynucleotide encoding the glutamate-cysteine ligase variant according to claim 1.

5. A vector comprising the polynucleotide of claim 4.

6. A microorganism producing glutathione comprising at least one of: the glutamate-cysteine ligase variant according to claim 1; a polynucleotide encoding the variant; and a vector comprising the polynucleotide.

7. The microorganism of claim 6, wherein the microorganism is a microorganism belonging to the genus *Saccharomyces*.

8. The microorganism of claim 6, wherein the microorganism is *Saccharomyces cerevisiae*.

9. The microorganism of claim 6, wherein the microorganism is a *Saccharomyces cerevisiae* strain deposited with Accession No. KCCM12659P.

10. A method of producing glutathione, the method comprising culturing a microorganism comprising at least one of: the glutamate-cysteine ligase variant according to claim 1; a polynucleotide encoding the variant; and a vector comprising the polynucleotide, in a culture medium.

11. The method of claim 10, further comprising recovering glutathione from at least one selected from the cultured microorganism, a dried product of the microorganism, an extract of the microorganism, a culture of the microorganism, and a lysate of the microorganism.

12. A polynucleotide encoding the glutamate-cysteine ligase variant according to claim 2.

13. A polynucleotide encoding the glutamate-cysteine ligase variant according to claim 3.

14. A microorganism producing glutathione, the microorganism comprising at least one of: the glutamate-cysteine ligase variant according to claim 2; a polynucleotide encoding the variant; and a vector comprising the polynucleotide.

15. A microorganism producing glutathione, the microorganism comprising at least one of: the glutamate-cysteine ligase variant according to claim 3; a polynucleotide encoding the variant; and a vector comprising the polynucleotide.

16. A method of producing glutathione, the method comprising
Culturing, in a culture medium, a microorganism comprising at least one selected from the group consisting of the glutamate-cysteine ligase variant according to claim 2; a polynucleotide encoding the glutamate-cysteine ligase variant; and a vector comprising the polynucleotide.

17. A method of producing glutathione, the method comprising
culturing, in a culture medium, a microorganism comprising at least one selected from the group consisting of the glutamate-cysteine ligase variant according to claim 3; a polynucleotide encoding the glutamate-cysteine variant; and a vector comprising the polynucleotide.

18. The method of claim 10, wherein the microorganism is a microorganism belonging to the genus *Saccharomyces*.

19. The method of claim 16, wherein the microorganism is a microorganism belonging to the genus *Saccharomyces*.

20. The method of claim 17, wherein the microorganism is a microorganism belonging to the genus *Saccharomyces*.

* * * * *